(12) United States Patent
Nakazato et al.

(10) Patent No.: US 11,983,891 B2
(45) Date of Patent: May 14, 2024

(54) MOVING TARGET TRACKING DEVICE, MOVING TARGET TRACKING METHOD, MOVING TARGET TRACKING SYSTEM, LEARNING DEVICE, AND PROGRAM

(71) Applicant: Nippon Telegraph and Telephone Corporation, Tokyo (JP)

(72) Inventors: Hikotoshi Nakazato, Musashino (JP); Kenji Abe, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 41 days.

(21) Appl. No.: 17/801,889

(22) PCT Filed: Feb. 25, 2020

(86) PCT No.: PCT/JP2020/007345
§ 371 (c)(1),
(2) Date: Aug. 24, 2022

(87) PCT Pub. No.: WO2021/171338
PCT Pub. Date: Sep. 2, 2021

(65) Prior Publication Data
US 2023/0082600 A1    Mar. 16, 2023

(51) Int. Cl.
*G06T 7/292* (2017.01)
*H04N 23/695* (2023.01)

(52) U.S. Cl.
CPC .......... *G06T 7/292* (2017.01); *H04N 23/695* (2023.01); *G06T 2207/20081* (2013.01)

(58) Field of Classification Search
None
See application file for complete search history.

(56) References Cited

U.S. PATENT DOCUMENTS 9,907,147 B2 * 2/2018 Chen ..................... F21V 14/06
10,699,421 B1 * 6/2020 Cherevatsky .......... G06V 20/52
(Continued)

FOREIGN PATENT DOCUMENTS

WO    WO 2017/047687    3/2017

OTHER PUBLICATIONS

Everts, Ivo, Nicu Sebe, and Graeme A. Jones. "Cooperative Object Tracking with Multiple PTZ Cameras." ICIAP. vol. 7. 2007. (Year: 2007).*

(Continued)

*Primary Examiner* — Stefan Gadomski
(74) *Attorney, Agent, or Firm* — Fish & Richardson P.C.

(57) ABSTRACT

A moving target tracking device includes a position information creation unit that creates camera position information indicating adjacency relationships of a plurality of reference cameras and a plurality of pivoting cameras, a tracking target analysis unit that detects traveling information indicating a speed and a traveling direction of a moving target, a tracking score calculation unit that calculates a tracking score indicating a proportion at which the moving target has been able to be captured in the entire tracking section, a machine learning unit that creates, as record information, a control result obtained by a learning device that has learned a control value of each pivoting device corresponding to the traveling information such that the tracking score becomes higher, and a control information creation unit that creates control information by using the control value acquired with reference to the record information.

7 Claims, 14 Drawing Sheets

(56) References Cited

U.S. PATENT DOCUMENTS

| | | | | |
|---|---|---|---|---|
| 10,839,203 | B1* | 11/2020 | Guigues | G06T 7/292 |
| 11,475,249 | B2* | 10/2022 | Skuin | G06V 20/42 |
| 2009/0324010 | A1* | 12/2009 | Hou | G06V 20/52 |
| | | | | 382/103 |
| 2018/0336674 | A1* | 11/2018 | Lim | G06V 10/454 |
| 2019/0147607 | A1* | 5/2019 | Stent | G06F 3/012 |
| | | | | 382/103 |
| 2019/0156086 | A1* | 5/2019 | Plummer | G06T 7/248 |
| 2019/0258864 | A1* | 8/2019 | Lee | G06T 11/206 |
| 2020/0273180 | A1* | 8/2020 | Kaufmann | G06T 7/74 |
| 2021/0181758 | A1* | 6/2021 | Das | G05D 1/0248 |
| 2021/0264141 | A1* | 8/2021 | Chojnacki | G06V 40/25 |
| 2022/0406065 | A1* | 12/2022 | Kang | G06T 7/292 |

OTHER PUBLICATIONS

R. T. Collins, A. J. Lipton, H. Fujiyoshi and T. Kanade, "Algorithms for cooperative multisensor surveillance," in Proceedings of the IEEE, vol. 89, No. 10, pp. 1456-1477, Oct. 2001, doi: 10.1109/5.959341. (Year: 2001).*

Xiaogang Wang, Intelligent multi-camera video surveillance: A review, Pattern Recognition Letters, vol. 34, Issue 1, 2013, pp. 3-19 (Year: 2013).*

E. Price et al., "Deep Neural Network-Based Cooperative Visual Tracking Through Multiple Micro Aerial Vehicles," in IEEE Robotics and Automation Letters, vol. 3, No. 4, pp. 3193-3200, Oct. 2018, doi: 10.1109/LRA.2018.2850224. (Year: 2018).*

Li, J., Xu, J., Zhong, F., Kong, X., Qiao, Y., & Wang, Y. (2020). Pose-Assisted Multi-Camera Collaboration for Active Object Tracking. Proceedings of the AAAI Conference on Artificial Intelligence, 34(01), 759-766. https://doi.org/10.1609/aaai.v34i01.5419 ( Year: 2020).*

C. Micheloni, B. Rinner and G. L. Foresti, "Video Analysis in Pan-Tilt-Zoom Camera Networks," in IEEE Signal Processing Magazine, vol. 27, No. 5, pp. 78-90, Sep. 2010, doi: 10.1109/MSP.2010.937333. (Year: 2010).*

Aoki et al., "Evaluation of Object Tracking by Active Cameras and Coordinated Monitoring of the Whole Observation Area," IPSJ SIG Technical Report, Jan. 20, 2006, 2006-CVIM-152(14):101-108, 18 pages (with English Translation).

\* cited by examiner

FIG. 5

| CAMERA ID | FIXED (False)/ PIVOTING (True) | REFERENCE CAMERA (True/False) | LEFT-SIDE END POINT CAMERA (True/False) | RIGHT-SIDE END POINT CAMERA (True/False) | ADJACENT CAMERA (LEFT SIDE) | ADJACENT CAMERA (RIGHT SIDE) | CAMERA POSITION WITH RESPECT TO ROAD | REFERENCE CAMERA (LEFT SIDE) | REFERENCE CAMERA (RIGHT SIDE) | CAMERA WITHIN ONE HOP |
|---|---|---|---|---|---|---|---|---|---|---|
| A | False | True | True | False | NULL | ⟨1⟩ | UPPER | NULL | NULL | ⟨1⟩, ⟨2⟩ |
| B | False | True | False | False | ⟨2⟩ | ⟨3⟩ | UPPER | NULL | NULL | NULL |
| C | False | True | False | True | ⟨4⟩ | NULL | LOWER | NULL | NULL | ⟨3⟩, ⟨4⟩ |
| ⟨1⟩ | True | False | False | False | A | ⟨2⟩ | UPPER | A | B | NULL |
| ⟨2⟩ | True | False | False | False | ⟨1⟩ | B | UPPER | A | B | NULL |
| ⟨3⟩ | True | False | False | False | B | ⟨4⟩ | LOWER | B | C | NULL |
| ⟨4⟩ | True | False | False | False | ⟨3⟩ | C | UPPER | B | C | NULL |

| SPEED | TRAVELING DIRECTION | CAMERA <1> | CAMERA <2> | CAMERA <3> | CAMERA <4> | CAMERA <5> | TRACKING SCORE |
|---|---|---|---|---|---|---|---|
| 70~80 | 1 | [1, 78, 5], | [0, 34, 4], | [1, 97, 7], | [0, 135, 6], | [1, 49, 5], | 60 |
| | | [1, 46, 6], | [0, 69, 3], | [1, 142, 6], | [0, 86, 2], | [1, 23, 1], | 70 |
| | | [1, 74, 3], | [0, 28, 5], | [1, 127, 2], | [0, 62, 4], | [1, 96, 4], | 50 |
| | | ... | ... | ... | ... | ... | ... |

410

MOVING TARGET TRACKING DEVICE, MOVING TARGET TRACKING METHOD, MOVING TARGET TRACKING SYSTEM, LEARNING DEVICE, AND PROGRAM

CROSS-REFERENCE TO RELATED APPLICATIONS

This application is a National Stage application under 35 U.S.C. § 371 of International Application No. PCT/JP2020/007345, having an International Filing Date of Feb. 25, 2020, the disclosure of which is considered part of the disclosure of this application, and is incorporated by reference in its entirety into this application.

TECHNICAL FIELD

The present invention relates to a moving target tracking device, a moving target tracking method, a moving target tracking system, and a learning device and a program for controlling cooperative monitoring of a moving target by using a plurality of camera devices.

BACKGROUND ART

Techniques have been put into practical use for automatically detecting a target vehicle (tracking target) on a highway or the like and constantly capturing the target vehicle while switching between cameras in the surroundings of the vehicle. According to the conventional techniques in the related art, the target vehicles are continuously tracked between the cameras by predicting a traveling direction of the target vehicle and preparing cameras ahead in the traveling direction for capturing the vehicle (see NPL 1, for example).

CITATION LIST

Non Patent Literature

NPL 1: Katsuji Aoki, et al., "Functional Assessment of Cooperative Object Tracking and Surveillance of Whole Observation Area by Active Cameras", Research Report of Information Processing Society of Japan, 2006-CVIM-152, P. 101 to 108, 2006/1/20

SUMMARY OF THE INVENTION

Technical Problem

Unfortunately, in the related art, it is necessary to design with optimal installation for locations where camera devices are disposed and then install the camera devices in a case in which camera devices are disposed at a plurality of locations because an installation environment such as a road shape and a camera position with respect to the road (the distance of the camera from the road, the height from the ground, and the like) differs depending on each location.

Thus, it has not been possible for cameras to autonomously control tracking of a target vehicle (moving target) cooperatively recognizing mutual positions (relative positions).

Also, although the speed of a target vehicle may change due to acceleration or deceleration in practice, the related art method assumes that the speed of the target vehicle (moving target) does not change, and it may not be possible to follow a change in speed of the moving target.

The present invention has been made in view of such issues, and an object of the present invention is to perform control in which a plurality of camera devices cooperatively and autonomously track a moving target that changes its speed.

Means for Solving the Problem

A moving target tracking device according to the present invention tracks a moving target through control of a camera device group, in which the camera device group includes a reference camera that is fixed to image the moving target and a pivoting camera that images the moving target by following movement of the moving target, the moving target tracking device including a position information creation unit configured to create camera position information indicating adjacency relationships of a plurality of the reference cameras and a plurality of the pivoting cameras by using a capturing order and a traveling direction of the moving target that has passed through a tracking section for tracking the moving target, a tracking target analysis unit that acquires the images from the reference cameras and detects traveling information indicating a speed and the traveling direction of the moving target, a tracking score calculation unit that calculates a tracking score when the moving target passes through the tracking section, the tracking score being an evaluation value indicated by a proportion of any pivoting cameras that has been able to capture the moving target to all of the pivoting cameras in the tracking section, a machine learning unit including a learning device that outputs a control value including a rotation direction of the pivoting camera, a designated angle when tracking is started, and a rotation start time until a rotation starts after the designated angle is set, of each pivoting camera when the traveling information is input, the machine learning unit that acquires the tracking score as a result of controlling each pivoting camera using the control value obtained from the learning device and store, in a storage, the control value of each pivoting camera and the tracking score as record information in association with the traveling information, and a control information creation unit that refers to the record information when traveling information is acquired from the reference camera, acquires the control value for each pivoting camera corresponding to a tracking score that is equal to or greater than a predetermined value to create control information, and transmits the control information to each pivoting camera.

BRIEF DESCRIPTION OF DRAWINGS

FIG. 5 is a diagram illustrating a data configuration example of camera position information according to the present embodiment.

FIG. 6 is a diagram illustrating a data configuration example of record information according to the present embodiment.

DESCRIPTION OF EMBODIMENTS

Next, an embodiment of the present invention (hereinafter, referred to as the "present embodiment") is described. First, an overview of the present invention is described.

Overview

Figure 1:
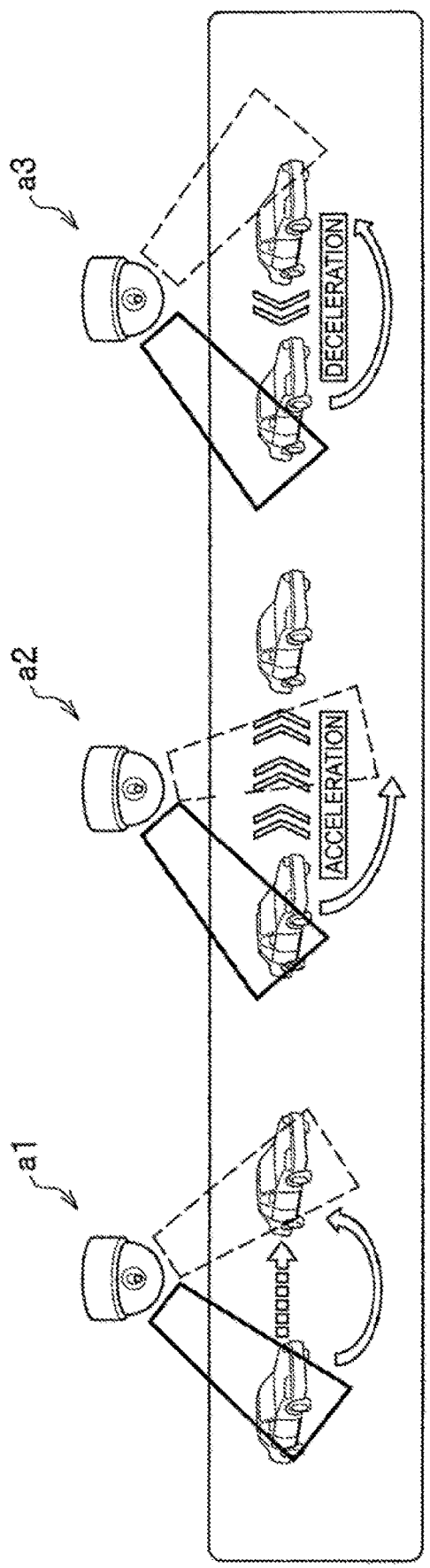
FIG. 1 is a diagram for explaining a technique of tracking a moving target in the related art.

According to the technique of tracking a moving target in the related art, it is not possible to cooperatively control a plurality of camera devices (hereinafter, simply referred to as "cameras" in some cases) to appropriately capture a target vehicle (moving target) in accordance with an installation environment. In a case in which a speed changes due to acceleration or deceleration, in particular, it is not possible to cause the cameras to autonomously perform control to detect the change and follow the change with cameras ahead in a traveling direction of the vehicle in a coordinated manner. As illustrated in FIG. 1, for example, it is possible to perform following if the speed does not change in the related art (see the reference sign a1). On the other hand, it is not possible to perform following in a case in which the target vehicle accelerates or decelerates (see the reference signs a2 and a3).

A moving target tracking device 1 according to the present embodiment performs control such that even in a case in which a speed changes due to acceleration or deceleration, cameras (fixed cameras) that detect the change and cameras that operate to follow the vehicle in a traveling direction of the vehicle cooperatively and autonomously track the target vehicle.

Figure 2:
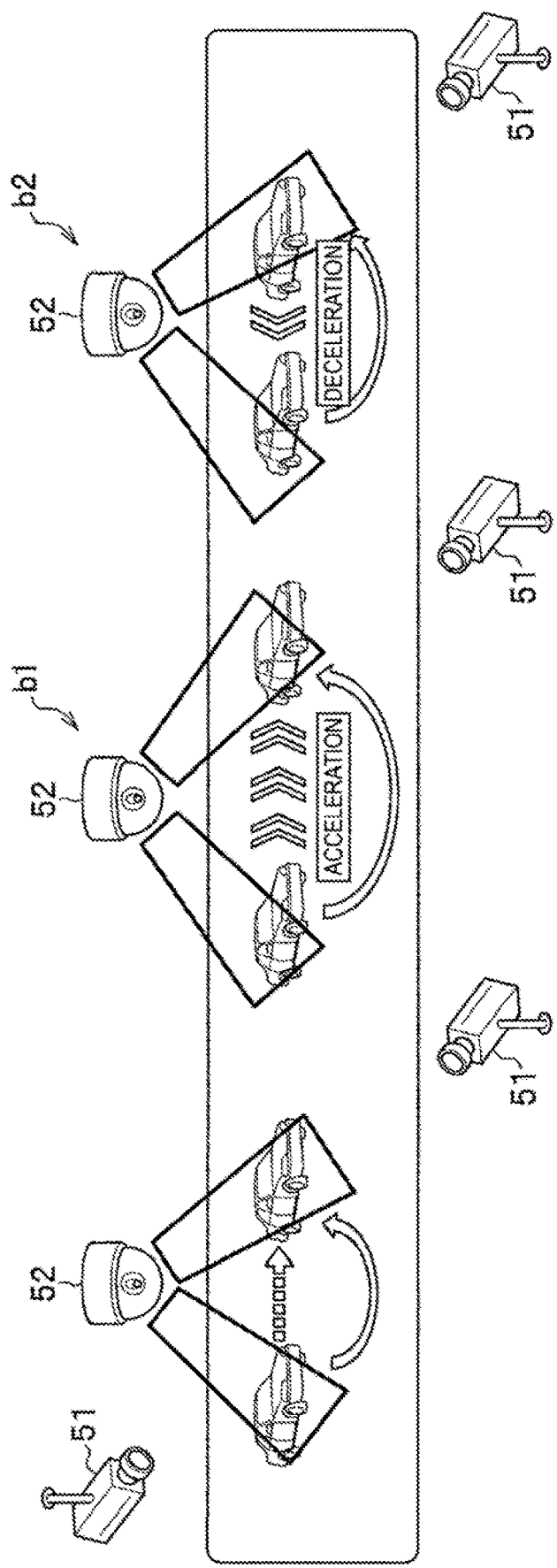
FIG. 2 is a diagram illustrating an outline of tracking of a moving target in the present embodiment.

Specifically, reference cameras 51 (fixed cameras) that detect a speed and a traveling direction of the target vehicle (moving target) and pivoting cameras 52 (adjacent cameras) that actually follow and image the target vehicle are arranged between a start point and a terminal point of a road on which the target vehicle is tracked as illustrated in FIG. 2.

Also, the moving target tracking device 1 sets information regarding optimal control values (such as rotation directions, designated angles, and rotation start times, for example) using the information regarding the speed and the traveling direction detected by the reference cameras 51 (fixed cameras) and controls the pivoting cameras 52 following in the traveling direction of the vehicle. In this manner, it is possible to track the target vehicle even in a case in which the speed is changed due to acceleration or deceleration (see the reference signs b1 and b2).

Note that the moving target tracking device 1 performs the calculation of the optimal control values by a method using machine learning (in a "learning phase" using a learner 100 (learning device), which is described below). At this time, the moving target tracking device 1 performs learning through the optimization such that a score related to vehicle tracking (a "tracking score", which is described below) becomes higher in all cameras (pivoting cameras 52) disposed at a start point and a terminal point of the road along which the target vehicle passes, rather than individually optimizing control for each of the plurality of cameras (pivoting cameras 52) that track the target vehicle.

In this manner, a moving target tracking system 1000 including the moving target tracking device 1 according to the present embodiment can perform control by causing the plurality of camera devices (the reference cameras 51 and the pivoting cameras 52) located between the start point and the terminal point (tracking section) to coordinate with each other and setting optimal control values for the entire tracking section in the individual pivoting cameras 52.

Hereinafter, the moving target tracking system 1000 including the moving target tracking device 1 according to the present embodiment is described in detail.

Embodiment

Figure 3:
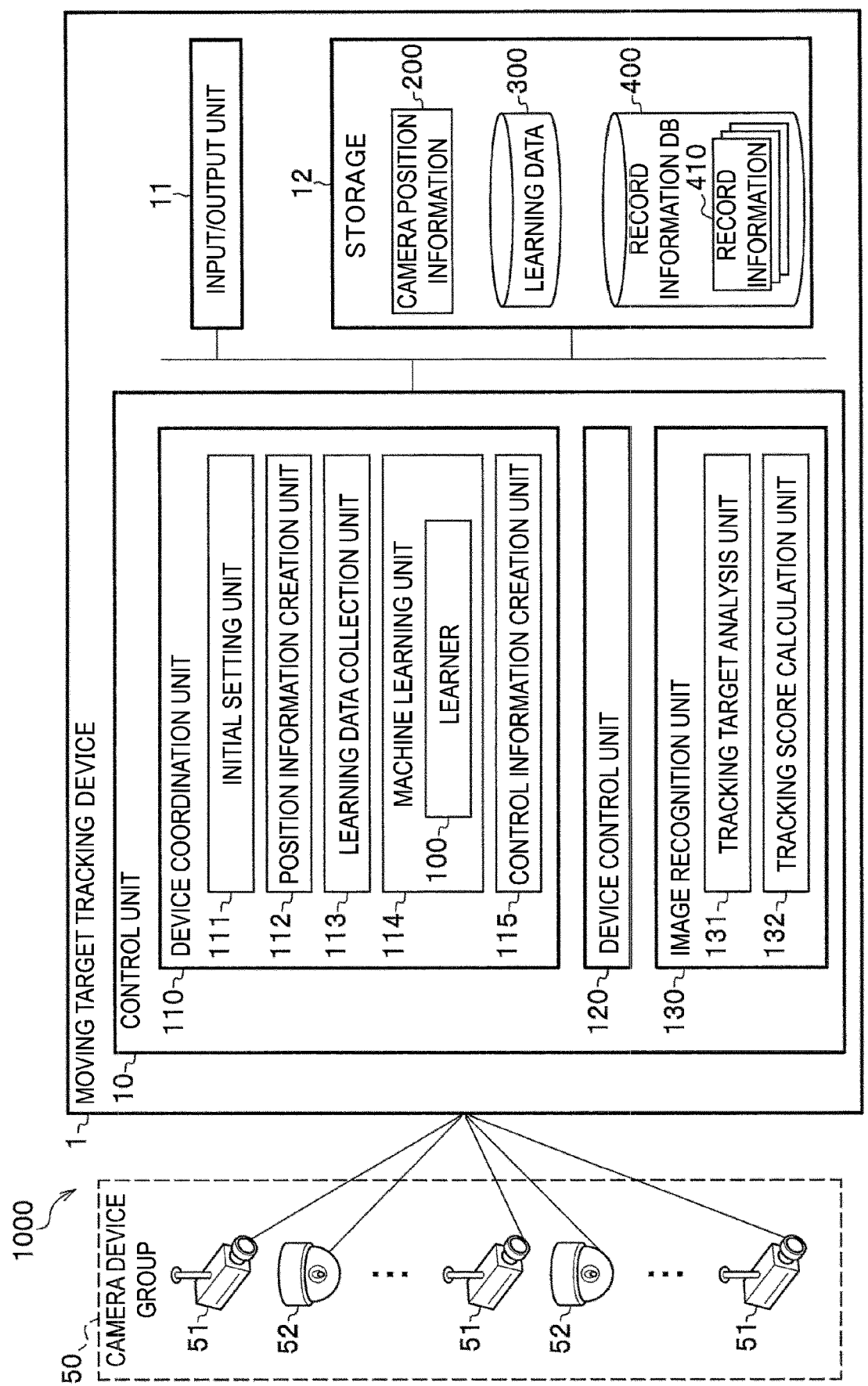
FIG. 3 is a diagram illustrating an overall configuration of a moving target tracking system including a moving target tracking device according to the present embodiment.

FIG. 3 is a diagram illustrating an overall configuration of the moving target tracking system 1000 including the moving target tracking device 1 according to the present embodiment.

The moving target tracking system 1000 includes a camera device group 50 including a plurality of reference cameras 51 that detect a speed and a traveling direction of a target vehicle (moving target) and pivoting cameras 52 that track and image the target vehicle and the moving target tracking device 1 that is communicatively connected to each camera device in the camera device group 50 and controls tracking of the target vehicle (moving target) performed by the pivoting cameras 52.

The reference cameras 51 are fixed cameras, disposed at end points that are a start point and a terminal point of a tracking section and also at any selected points. Also, the pivoting cameras 52 are cameras that actually track the target vehicle.

Each of the camera devices (the reference cameras 51 and the pivoting cameras 52) has a function of transmitting captured images to the moving target tracking device 1.

The configuration of the moving target tracking device 1 according to the present embodiment is described using FIG. 3.

The moving target tracking device 1 is a device that creates optimal control information for the camera devices (pivoting cameras 52) in the tracking section to track and image the target vehicle (moving target) that changes its speed through acceleration, deceleration, or the like, transmits the control information, and thereby controls each of the camera devices (pivoting cameras 52).

The moving target tracking device 1 executes (1) a position information creation phase in which relative position information ("camera position information", which is described below) of each of the camera devices (the reference cameras 51 and the pivoting cameras 52) constituting the camera device group 50 is created, (2) a learning phase in which a vehicle is caused to actually pass through the tracking section, angles ("designated angles", which is described below) of the cameras, timings ("rotation start times", which is described below) at which the cameras are caused to move, and the like are learned, and a result of accumulating learning is generated as record information 410 (see FIG. 6, which is described below), and (3) an operation phase in which control information for the camera devices (pivoting cameras 52) to obtain an optimal tracking score is acquired from passing vehicle conditions with reference to the record information 410, and the camera devices (pivoting cameras 52) are controlled.

The moving target tracking device 1 includes a control unit 10, an input/output unit 11, and a storage 12.

The input/output unit 11 inputs and outputs information between other devices (the reference cameras 51, the pivoting cameras 52, and the like in the camera device group 50). The input/output unit 11 includes a communication interface for transmitting and receiving information via a communication line and an input/output interface for inputting information from an input device such as a keyboard and outputting to an output device such as a monitor, which are not illustrated.

The storage 12 is configured with a hard disk, a flash memory, a random access memory (RAM), or the like.

The storage 12 stores camera position information 200 (see FIG. 5, which is described below), learning data 300, and record information database (DB) 400 (which is described below in detail).

Further, the storage 12 temporarily stores programs for causing each functional unit in the control unit 10 to be executed and information necessary for the control unit 10 to perform processing.

The control unit 10 is configured to generally manage processing executed by the moving target tracking device 1 and to include a device coordination unit 110, a device control unit 120, and an image recognition unit 130.

The device coordination unit 110 creates control information to cause the reference cameras 51 and the pivoting cameras 52 to coordinate, by executing the aforementioned three phases, namely the position information creation phase, the learning phase, and the operation phase.

The device coordination unit 110 includes an initial setting unit 111, a position information creation unit 112, a learning data collection unit 113, a machine learning unit 114, and a control information creation unit 115.

The initial setting unit 111 determines which of the aforementioned three phases is to be executed in a stage at a current timing for the processing of the target tracking section. Then, the device coordination unit 110 generates control information for the pivoting cameras 52 in accordance with each determined phase.

Specifically, in a case in which it is determined that the position information creation phase is to be executed in a stage at a current timing, the initial setting unit 111 generates control information (control information for resetting an angle) of setting the position of a pivoting camera before the vehicle travels at 90 degrees (forward position) with respect to a longitudinal direction of the road in the tracking section. Note that it is not known which of the left direction and the right direction in the road the target vehicle will to travel from in the position information creation phase before the vehicle travels, each pivoting camera 52 is set to direct in a forward direction in the road (perpendicular to the road).

Also, the initial setting unit 111 can determine that the position information creation phase is to be executed in the stage at the current timing based on the fact that data of each item other than default setting has not been stored in camera position information 200 illustrated in FIG. 5, which is described below, for example. Additionally, the initial setting unit 111 may determine that the position information creation phase is to be executed in the stage at the current timing by acquiring, from an external management device (not illustrated), information indicating that the position information creation phase is to be executed in this stage.

When the current phase of the target tracking section is not in the stage in which the position information creation phase is to be executed, that is, in a case of a stage in which the learning phase or the operation phase is to be executed, the initial setting unit 111 creates control information to change an angle of the pivoting cameras 52 disposed within one hop from the reference cameras 51 at end points located at ends of the tracking section (hereinafter, referred to as "end point cameras") to a preparation angle (45 degrees). Note that the reference camera 51 (end point camera) at the end point described here means the reference cameras 51 located at both left and right ends of the tracking section. Also, one hop means an interval from a certain reference camera 51 to the next reference camera 51 on the road in the tracking section.

Then, the initial setting unit 111 generates control information (control information for resetting an angle) for setting pivoting cameras 52 other than the pivoting cameras 52 within one hop from the end point cameras to have a forward direction onto the road (perpendicular to the road).

Once the initial setting unit 111 generates the control information for resetting the angle of the pivoting cameras 52 and the control information for changing the angle to the preparation angle in each phase, then the initial setting unit 111 outputs the control information to the device control unit 120.

The position information creation unit 112 acquires information (images) related to the vehicle traveling in the tracking section via the image recognition unit 130 in order to acquire the position information (camera position information 200) from each camera device in the tracking section. Then, the position information creation unit 112 creates position information such as an installation direction of each camera device and adjacency relationships with other camera devices from the capturing order of the target vehicle and the traveling direction of the target vehicle captured by each camera device.

Figure 4:
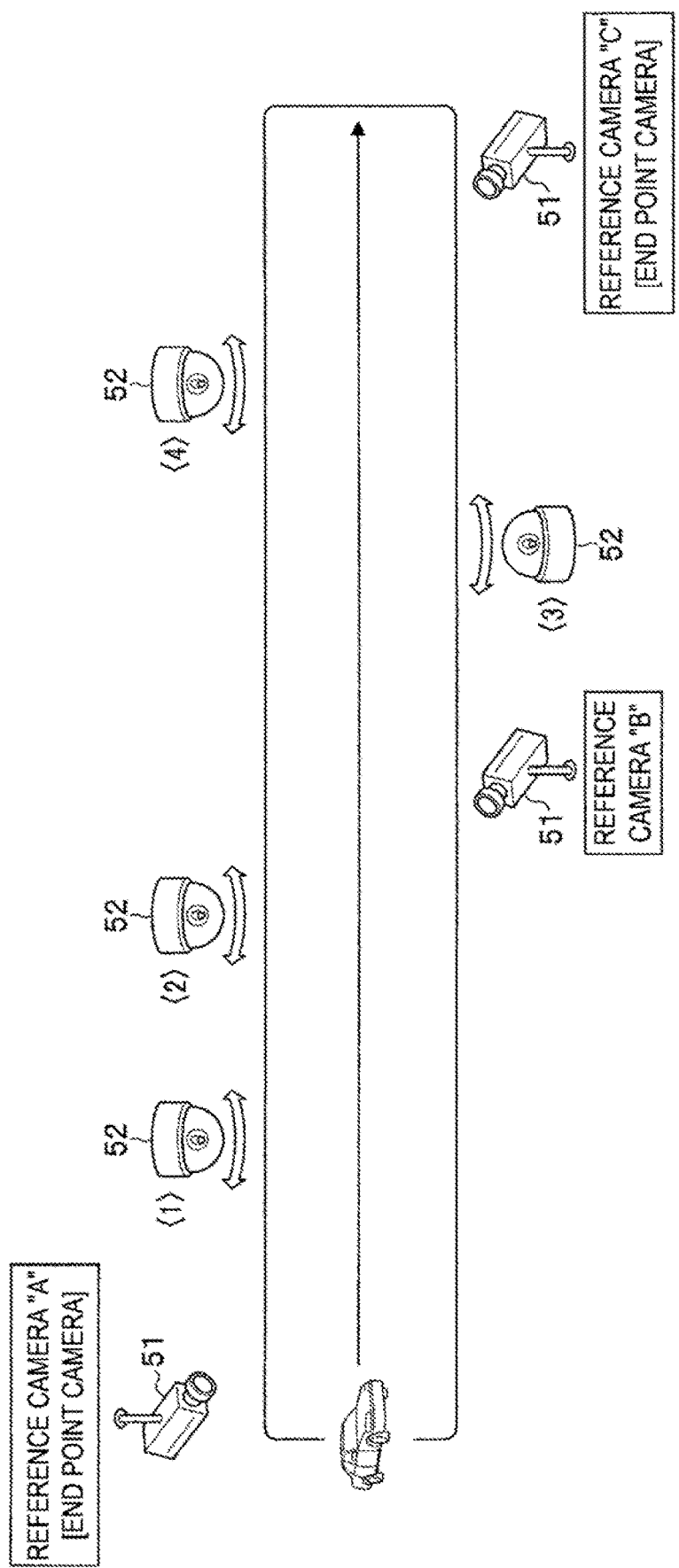
FIG. 4 is a diagram illustrating a disposition example of camera devices in a tracking section in the present embodiment.

Here, an example in which disposition of the reference cameras 51 and the pivoting cameras 52 in the tracking section is in the state as illustrated in FIG. 4 is described.

FIG. 5 is a diagram illustrating a data configuration example of the camera position information 200 according to the present embodiment.

Information surrounded by the solid line in the camera position information 200 is information set as a default. Specifically, a "camera ID" that is camera identification information, "fixed (false)/pivoting (true)" as information indicating which of a fixed camera and a pivoting camera the corresponding camera is, "reference camera (true/false)" indicating that the camera is a reference camera 51, and a "camera position with respect to road" are set. As the "camera position with respect to road", "up" or "down" may be set with respect to the reference cameras 51 in the camera device group 50. Note that "up" indicates that the camera is directed downward, that is, the road is imaged in an obliquely downward direction from a camera installed at a high position with respect to the road surface. On the other hand, "down" indicates that the orientation of the camera is a substantially horizontal direction with respect to the road surface. FIG. 5 illustrates that the reference cameras 51 with camera IDs "A" and "B" are set to "up" while the reference camera 51 with a camera ID "C" is set to "down" as a default.

Also, information at the part whose frame is surrounded by hatching in the camera position information 200 in FIG. 5 is information stored by the image recognition unit 130.

In regard to "adjacent camera (adjacent on left side)" and "adjacent camera (adjacent on right side)", camera devices adjacent to a host camera on the left and right sides (hereinafter, referred to as "adjacent cameras") are identified by identifying the vehicle through image recognition processing performed by the image recognition unit 130.

For example, the end point camera (reference camera 51) with the camera ID "A" is represented as "NULL" for the adjacent camera on the left side because there is no camera, and is represented as "pivoting camera <1>" for the adjacent camera on the right side (see FIG. 4). Moreover, in regard to the pivoting camera 52 that is the camera <1>, "reference camera "A" is represented as the adjacent camera on the left side, and "pivoting camera <2>" is represented as the adjacent camera on the right side (see FIG. 4).

Also, information regarding the camera positions of the pivoting cameras 52 with respect to the road is stored through image analysis performed by the image recognition unit 130.

The position information creation unit 112 creates and stores information such as "end point camera on left side (true/false)", "end point camera on right side (true/false)", "reference camera (left direction)", "reference camera (right direction)", and "cameras within one hop", which is information that has not yet been stored as the camera position information 200, by acquiring information regarding the traveling vehicle in the tracking section from the image recognition unit 130.

Then, the position information creation unit 112 stores "true" as "end point camera on left side (true/false)" for the camera ID "A" in the case of the example illustrated in FIG. 4. "True" is stored as "end point camera on right side (true/false) for the camera ID "C".

The camera IDs of the closest reference cameras in the left direction and the right direction when seen from the pivoting cameras 52 are stored in "reference camera (left direction)" and "reference camera (right direction)". For the pivoting camera <2>, for example, the camera ID "A" is stored in "reference camera (left direction)" while the camera ID "B" is stored in "reference camera (right direction)".

Information regarding the pivoting cameras 52 disposed within one hop from the end point camera is stored in "cameras within one hop".

In regard to the end point camera with the camera ID "A", for example, information regarding the pivoting cameras <1> and <2> between the end point camera and the next reference camera "B" in the traveling direction is stored (see FIG. 4).

The information in "cameras within one hop" is information referred to when the designated angles (which is described below in detail) of the pivoting cameras 52 corresponding to the end point cameras are set in the operation phase.

Note that the processing in which the position information creation unit 112 creates the camera position information 200 (FIG. 5) described above is executed in a case in which the position coordinates of the pivoting cameras 52 are not known in advance. For example, the processing is executed in a case in which the pivoting cameras 52 are randomly installed in a certain area or in a case in which the pivoting cameras 52 are temporarily installed for an event or the like.

Also, position coordinates of the reference cameras 51 are known in advance as an assumption.

Returning to FIG. 3, the learning data collection unit 113 determines that the position information creation phase has ended and the stage of the learning phase has started, based on the fact that all the pieces of the information have been stored in the camera position information 200 (FIG. 5).

Then, the learning data collection unit 113 acquires, from the image recognition unit 130, information regarding the "speed" and the "traveling direction" of the target vehicle (hereinafter, referred to as "traveling information") as information regarding the traveling vehicle obtained by the reference cameras 51 disposed in the tracking section. Then, the learning data collection unit 113 calculates, as random values, each piece of information regarding control values (such as rotation directions, designated angles, and rotation start times, for example) that are set for the following pivoting cameras 52 in the traveling direction of the vehicle from the reference cameras 51.

Here, the rotation directions are directions in which the pivoting cameras 52 are caused to rotate in accordance with the traveling direction. The designated angles are angles designated when the pivoting cameras 52 start to perform imaging. The rotation start times are times until imaging is started (that is, the cameras are caused to rotate) after the timing at which the cameras are set at the designated angles.

The learning data collection unit 113 collect learning data by performing processing of randomly generating the information regarding the control values every time the traveling information (the speed and the traveling direction) is acquired from the image recognition unit 130 until the number of pieces of collected data becomes equal to or greater than a predetermined threshold value. Then, the learning data collection unit stores, as one set of learning data 300 in the storage 12, the acquired traveling information (the speed and the traveling direction), the set control values (the rotation method, the designated angles, and the rotation start times), and information regarding a tracking score (which is described below in detail) calculated by the image recognition unit 130 (tracking score calculation unit 132, which is described below), as a result of the control.

Note that the tracking score is an evaluation value indicating a proportion of any of the plurality of pivoting cameras 52 that have been able to capture the tracking target to the entire tracking section. Specifically, the tracking score is a value indicated by a proportion of a time during which one or more pivoting cameras 52 have been able to recognize the target vehicle at a predetermined recognition rate or more to a time required by the target vehicle to pass through the entire tracking section. In other words, the tracking score is an index for evaluating a result of tracking the target vehicle in the entire tracking section rather than evaluating an identification rate of the target vehicle for the individual pivoting cameras 52.

The machine learning unit 114 includes a learner 100 (learning device). The learner 100 is configured with, for example, a multilayer perceptron (neural network) and performs machine learning.

The machine learning unit 114 performs machine learning on the learner 100 using the learning data 300 stored by the learning data collection unit 113 in the storage 12.

Specifically, the machine learning unit 114 causes the learner 100 to learn the traveling information (the speed and the traveling direction), the control values (the rotation direction, the designated angle, and the rotation start time) of each pivoting camera 52, and the information regarding the tracking score. Once the traveling information (the speed and the traveling direction) is input, the machine learning unit 114 causes the learner 100 to construct the learning model outputting the control values (the rotation direction, the designated angle, and the rotation start time) of each pivoting camera 52 such that a higher tracking score is obtained.

Also, if the learning based on the random values exceeds a predetermined threshold value, then the machine learning unit 114 inputs the traveling information (the speed and the traveling direction) to the learner 100 and causes the learner 100 to calculate the information regarding the control values (the rotation direction, the designated angle, and the rotation start time) of each pivoting camera 52 as output data. Then, the machine learning unit 114 causes the control information using the calculated control values to be transmitted to each pivoting camera 52 via the device control unit 120.

The machine learning unit 114 inputs the learning data 300 indicating the traveling information, the control values, and the tracking score collected by the learning data collection unit 113 to the learner 100 and causes the learner 100 to perform machine learning. Then, the machine learning unit 114 stores, in the record information DB 400, the traveling information, the control values, and the information regarding the tracking score that the learner 100 has been caused to learn as record information 410 (FIG. 6) in which data is summarized for each predetermined range of speed (for example, a predetermined speed width divided by such as every 10 kilometers per hour).

FIG. 6 is a diagram illustrating a data configuration example of the record information 410 according to the present embodiment.

As the record information 410, the information regarding the control values (the rotation direction, the designated angle, and the rotation start time) of each pivoting camera 52 and the information regarding the tracking score obtained by execution according to the control values are stored in association with the traveling information (the speed and the traveling direction).

Here, the speeds assumed to belong to the same data range divided by, for example, every 10 kilometers per hour. In FIG. 6, one range of speed that is equal to or greater than 70 kilometers per hour and less than 80 kilometers per hour is handled as data of the same range. As the traveling direction, the direction of the road defined in advance in the tracking section is represented as "1" while the opposite direction is represented as "0".

The control values of each pivoting camera 52 are a rotation direction, a designated angle, and a rotation start time. As the rotation direction, the rotation in the same direction as the predefined direction at the time of the tracking of the target vehicle is represented as "1" (for example, from the right to the left) while the rotation in the opposite direction is represented as "0" (from the left to the right). The designated angle is an angle represented as 0 degrees (reference value) in a case in which the angle is parallel to the road, for example, and is an angle designated when the rotation for tracking the target vehicle is started. The rotation start time is a time (seconds) until rotation is started after the time on which the designated angle is set as a reference.

The record information 410 is created by associating the control values and the tracking score of each pivoting camera 52 for every combination of the speed range (in units of 10 kilometers per hour, for example) and the traveling direction.

Returning to FIG. 3, once the control information creation unit 115 acquires the traveling information (the speed and the traveling direction) obtained by each reference camera 51 in the tracking section from the image recognition unit 130 in the operation phase, then the control information creation unit 115 accesses to the record information DB 400, refers to the record information 410 corresponding to the speed and the traveling direction indicated by the traveling information, acquires the control values for each pivoting camera 52 associated with a tracking score value that is equal to or greater than a predetermined value to create control information, and outputs the control information to the device control unit 120. Note that the "tracking score value that is equal to or greater than the predetermined value" referred to by the control information creation unit 115 is optimally the "highest tracking score value", and the following description will thus be given on the assumption of the highest tracking score value.

Also, when the control information creation unit 115 acquires from the image recognition unit 130 the traveling information (the speed and the traveling direction) obtained from the reference camera 51, the control information creation unit 115 creates control information to set the pivoting cameras 52 other than the pivoting cameras 52 within one hop from the reference camera 51 at the preparation angle (45 degrees).

Note that the preparation angle is an angle at which the camera is directed to an entry direction of the moving target (target vehicle) and is, for example, 45 degrees. The preparation angle is set beforehand for preparation such that the target vehicle can be tracked in time.

The device control unit 120 transmits the control information created by the device coordination unit 110 to each pivoting camera 52.

Here, the control of each pivoting camera 52 in the operation phase performed by the moving target tracking device 1 is described with reference to FIGS. 7 and 8.

Figure 7:
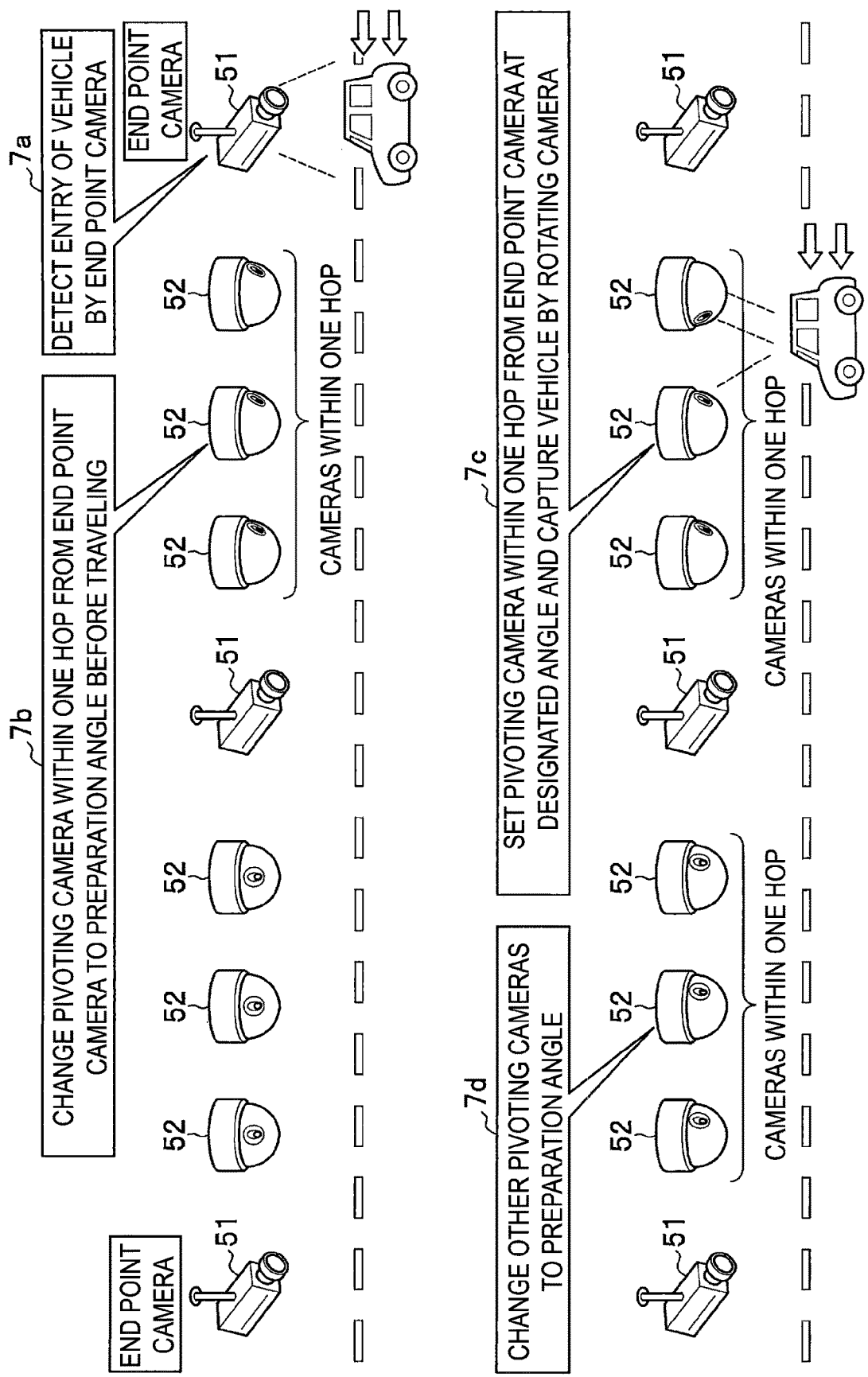
FIG. 7 is a diagram for explaining control of each camera device performed by the moving target tracking device according to the present embodiment.

As illustrated in FIG. 7, the end point camera (reference camera 51) at the right end of the tracking section detects entry of the target vehicle (see the reference sign 7a). Note that the device control unit 120 of the moving target tracking device 1 acquires the information regarding the pivoting cameras 52 within one hop from the end point camera with reference to the camera position information 200 (FIG. 5) and changes the angle to the preparation angle at the timing at which the operation phase is started (see the reference sign 7b).

Next, if the entry of the target vehicle is detected, the image recognition unit 130 analyzes the traveling information (the speed and the traveling direction). Then, the control information creation unit 115 of the moving target tracking device 1 accesses to the record information DB 400, selects the one with the highest tracking score in the corresponding record information 410, and generates control information. In this manner, the pivoting cameras 52 within one hop from the end point camera at the right end are set to the designated angle that is an angle for actually tracking the target vehicle, and when the rotation start time arrives, the camera is rotated to capture the target vehicle (see the reference sign 7c).

At this time, the control information creation unit 115 changes the angles of pivoting cameras 52 within one hop from the next reference camera 51 in the traveling direction of the vehicle to the preparation angle (see the reference sign 7d).

Figure 8:
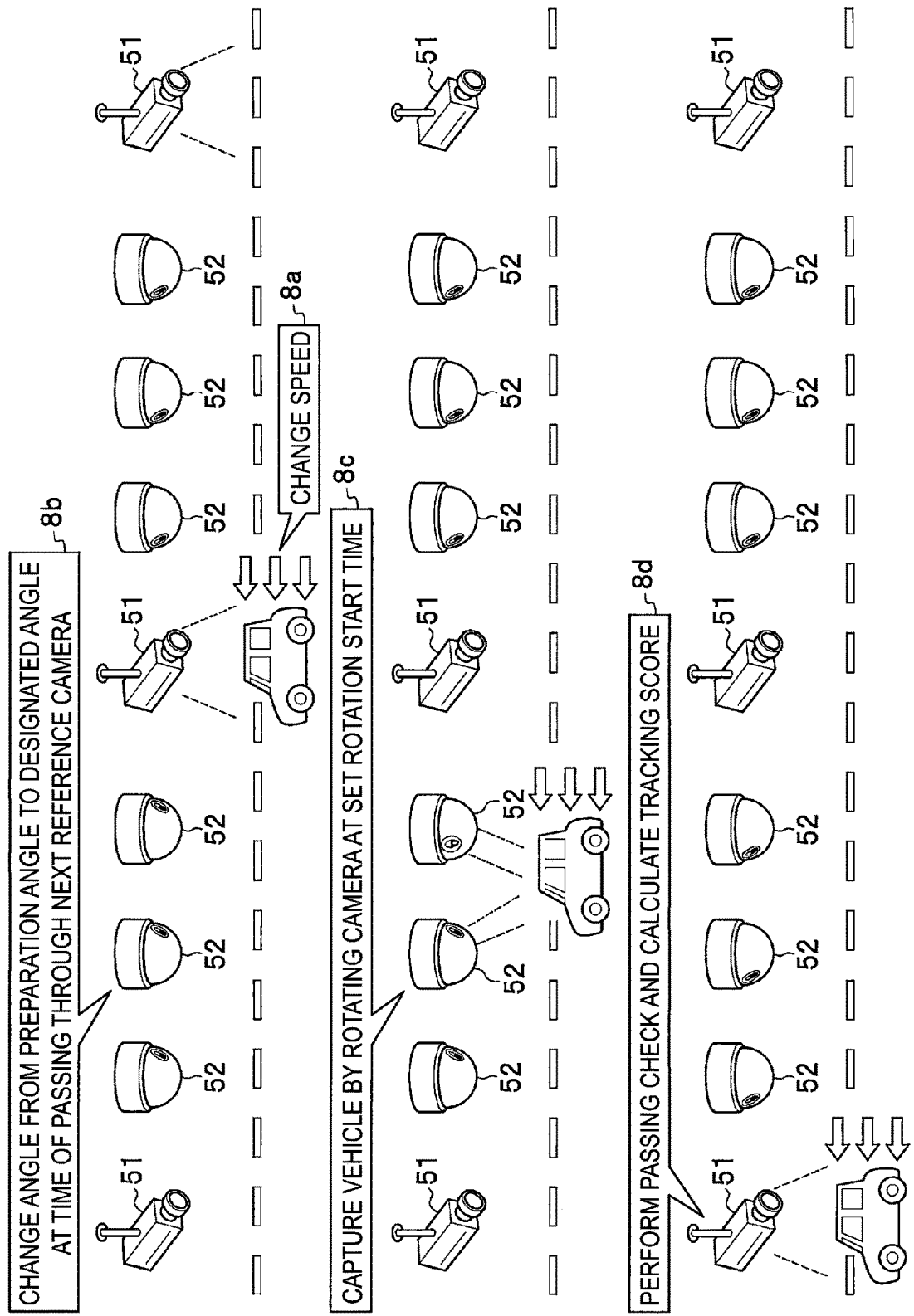
FIG. 8 is a diagram for explaining control of each camera device performed by the moving target tracking device according to the present embodiment.

In FIG. 8, the target vehicle is detected by the next reference camera 51, and the traveling information is analyzed by the image recognition unit 130. In this manner, the moving target tracking device 1 recognizes that there has been a change in speed of the target vehicle (see the reference sign 8a).

At this time, the control information creation unit 115 uses the analyzed traveling information, accesses to the record information DB 400, selects the one with the highest tracking score in the record information 410 of the corresponding speed, and generates control information.

Then, the control information creation unit 115 changes the angles of the pivoting cameras 52 within one hop from the reference camera 51 that has detected the target vehicle from the preparation angle to the designated angle (see the reference sign 8b).

Next, each pivoting camera 52 rotates and captures the target vehicle when the rotation start time arrives (reference sign 8c).

Then, if the end point camera at the left end confirms passing of the target vehicle through the tracking section, then the image recognition unit 130 (tracking score calculation unit 132) of the moving target tracking device 1 calculates a tracking score related to the tracking of the target vehicle (reference sign 8d).

In this manner, the moving target tracking device 1 can perform control such that the reference cameras 51 and the pivoting cameras 52 cooperate to track the vehicle even in a case in which the target vehicle changes its speed.

Returning to FIG. 3, the image recognition unit 130 acquires image information from each camera device (reference camera 51 and the pivoting cameras 52) in the camera device group 50, performs image analysis, and calculates a tracking score for the control information for each pivoting camera 52 in the tracking section.

The image recognition unit 130 includes a tracking target analysis unit 131 and a tracking score calculation unit 132.

The tracking target analysis unit 131 acquires captured images from the reference cameras 51 and the pivoting cameras 52. Then, the tracking target analysis unit 131 analyzes the acquired image from each camera device, acquires information regarding adjacent cameras on the left side and the right side of each camera device and information regarding the camera position with respect to the road, and stores the information in the camera position information 200 in the storage 12.

Also, the tracking target analysis unit 131 acquires traveling information (the speed and the traveling direction) through analysis of the images acquired from the reference cameras 51 and outputs the traveling information to the device coordination unit 110.

The tracking score calculation unit 132 calculates a tracking score (S) for evaluating control values of the control information for each pivoting camera 52 based on the following equation (1).

$$S = T_m/T_A \times 100 \qquad \text{Equation (1)}$$

Here, $T_A$ is a time required by the target vehicle to pass through the tracking section. $T_A$ is a value obtained by subtracting a time at which the end point camera at the start point of the tracking section starts to capture the target vehicle from a time at which the end point camera at the terminal point of the tracking section captures the target vehicle.

$T_m$ is a time during which the target vehicle passing through the tracking section is recognized at a predetermined recognition rate or more by any one or more of the pivoting cameras 52.

The tracking score becomes higher as the time during which the target vehicle is recognized becomes longer throughout the tracking section.

The tracking score calculated by the tracking score calculation unit 132 is output to the device coordination unit 110, and the tracking score is thus stored as learning data 300 and is used as input information for the learner 100.

Flow of Processing

Next, a flow of processing executed by the moving target tracking system 1000 including the moving target tracking device 1 according to the present embodiment is described.

First, initial setting processing executed by the initial setting unit 111 of the moving target tracking device 1 is described, and then processing in each of the position information creation phase, the learning phase, and the operation phase is described.

Initial Setting Processing

Figure 9:
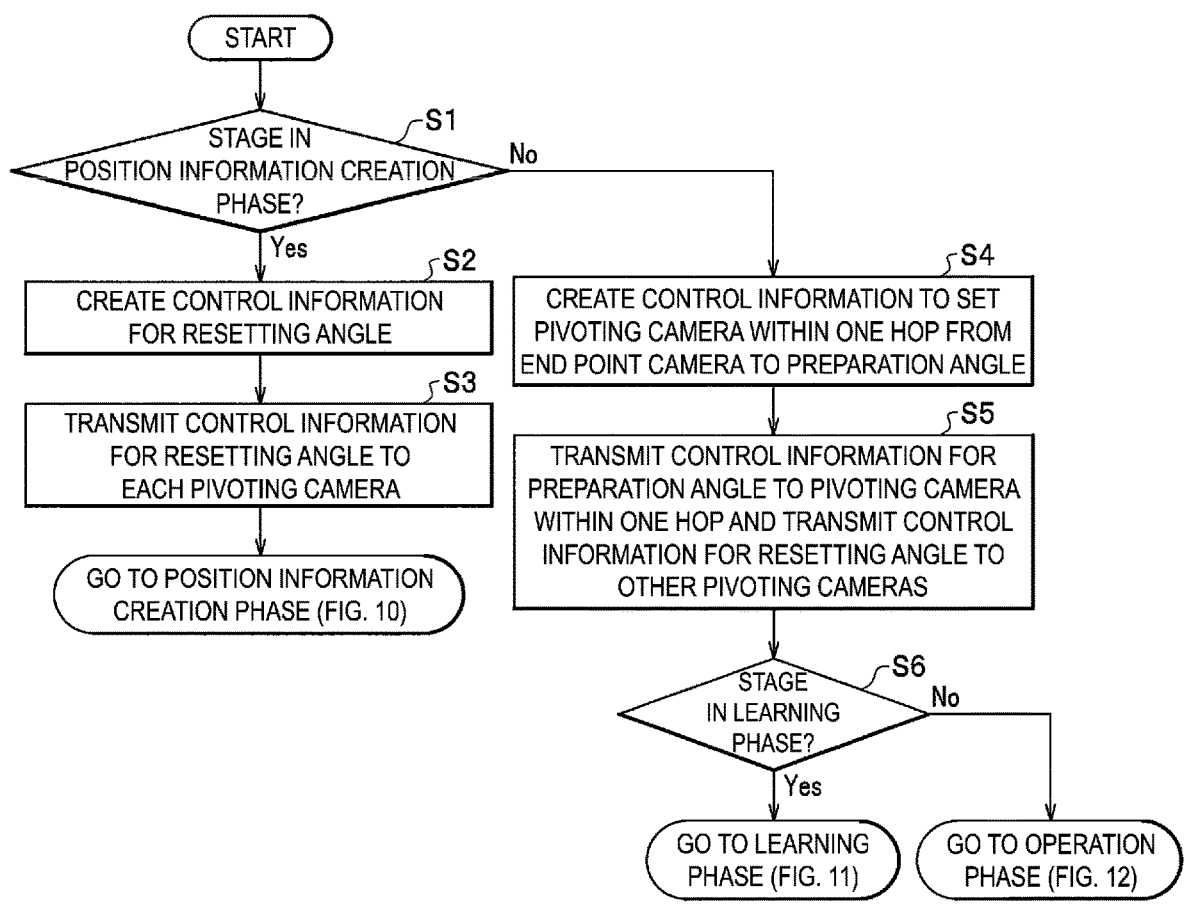
FIG. 9 is a flowchart illustrating a flow of initial setting processing executed by the moving target tracking device according to the present embodiment.

FIG. 9 is a flowchart illustrating a flow of initial setting processing executed by the moving target tracking device 1 according to the present embodiment.

First, the initial setting unit 111 of the moving target tracking device 1 determines whether or not the position information creation phase is to be executed in the stage at the current timing before the processing is started (Step S1).

If the phase at the current point is in a stage in which the position information creation phase is to be executed, the processing proceeds to Step S2. If the position information creation phase has already been executed, that is, in the stage of the learning phase or the operation phase, the processing proceeds to Step S4.

In a case in which it is determined that the position information creation phase is to be executed in this stage in Step S1 (Step S1→Yes), the initial setting unit 111 creates control information for resetting the angle of each pivoting camera 52 (Step S2). The control information for resetting the angle is control information for setting the angle to 90 degrees (front angle) with respect to the longitudinal direction of the road in the tracking section.

The initial setting unit 111 transmits the created control information for resetting the angle to each pivoting camera 52 via the device control unit 120 (Step S3).

In this manner, the camera direction of each pivoting camera 52 is set to face a front with respect to the road. Then, the processing proceeds to the position information creation phase (see FIG. 10), which is described below.

On the other hand, in a case in which it is determined that the position information creation phase has already been executed, that is, in a case in which the learning phase or the operation phase is to be started in this stage in Step S1 (Step S1→No), the processing proceeds to Step S4.

In Step S4, the initial setting unit 111 creates control information for setting the angles of the pivoting cameras 52 within one hop from the reference camera 51 (end point camera) at the end point to the preparation angle (45 degrees with respect to the longitudinal direction of the road). Also, the initial setting unit 111 creates control information for resetting the angles of the other pivoting cameras 52 (not within one hop from the end point camera) to 90 degrees (front angle) with respect to the longitudinal direction of the road in the tracking section.

The initial setting unit 111 transmits the created control information for the preparation angle to the pivoting cameras 52 within one hop from the end point camera and transmits the generated control information for resetting the angles to the other pivoting cameras 52 via the device control unit 120 (Step S5).

Next, the initial setting unit 111 determines whether or not the current phase is in a stage in which the learning phase is to be executed (Step S6). In other words, the initial setting unit 111 determines which of the learning phase and the operation phase is to be executed in the stage in the current phase.

Note that the initial setting unit 111 may determine that the phase at the current timing is in a stage in which the learning phase has already been ended and the operation phase is to be executed based on the fact that the data of the record information 410 has been accumulated and the number of items of data has become equal to or greater than a second threshold value or by acquisition of information indicating that the learning phase has been ended and the operation phase is to be executed in this stage from an external management device (not illustrated), for example.

If the initial setting unit 111 determines that the phase at the current timing is in a stage in which the learning phase is to be executed (Step S6→Yes), the processing proceeds to the learning phase (see FIG. 11), which is described below. On the other hand, it is determined that the learning phase has been ended and the phase at the current timing is in a stage in which the operation phase is to be executed (Step S6→No), the processing proceeds to the operation phase (see FIG. 12), which is described below.

Position Information Creation Phase

Next, the position information creation phase is described.

Figure 10:
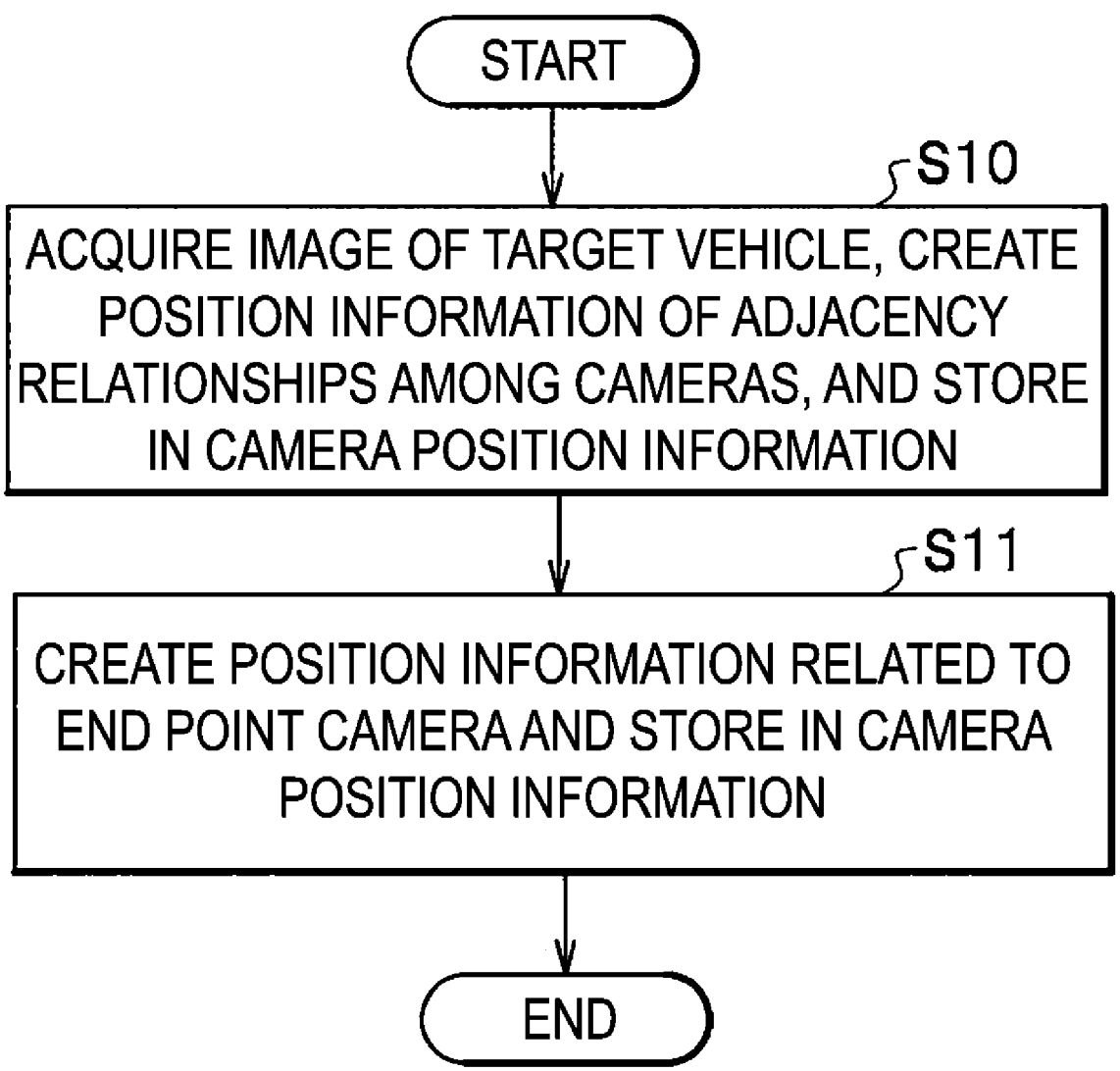
FIG. 10 is a flowchart illustrating a flow of processing in a position information creation phase executed by the moving target tracking device according to the present embodiment.

FIG. 10 is a flowchart illustrating a flow of processing in the position information creation phase executed by the moving target tracking device 1 according to the present embodiment.

In Step S10, the image recognition unit 130 (tracking target analysis unit 131) of the moving target tracking device 1 acquires an image of the target vehicle traveling in the tracking section from each of the camera devices (the reference cameras 51 and the pivoting cameras 52) first. Then, the tracking target analysis unit 131 creates position information regarding adjacency relationships and the like in the camera position information 200 illustrated in FIG. 5 through analysis of the acquired images.

Specifically, the tracking target analysis unit 131 acquires information regarding "adjacent camera (adjacent on the left side)" and "adjacent camera (adjacent on the right side)" and information regarding the camera positions "up" and "down" of the pivoting cameras 52 with respect to the road in the camera position information 200 and stores the acquired information in the camera position information 200. Note that the image recognition unit 130 can recognize the camera adjacency relationships from the order in which each of the camera devices (the reference cameras 51 and the pivoting cameras 52) has captured the specific target vehicle and the traveling direction of the target vehicle.

Next, in Step S11, the device coordination unit 110 (position information creation unit 112) of the moving target tracking device 1 creates position information related to the end point cameras (reference cameras 51), which is information that has not yet been stored in the camera position information 200 (FIG. 5), by acquiring the image information of the traveling vehicle in the tracking section from the image recognition unit 130.

Specifically, the position information creation unit 112 creates information such as "end point camera on left side (true/false)", "end point camera on right side (true/false)", "reference camera (left direction)", "reference camera (right direction)", and "cameras within one hop" in the camera position information 200 and stores the created information at corresponding locations in the camera position information 200.

In this manner, the moving target tracking device 1 generates the camera position information 200 and ends the position information creation phase.

Learning Phase

Next, the learning phase is described.

Figure 11:
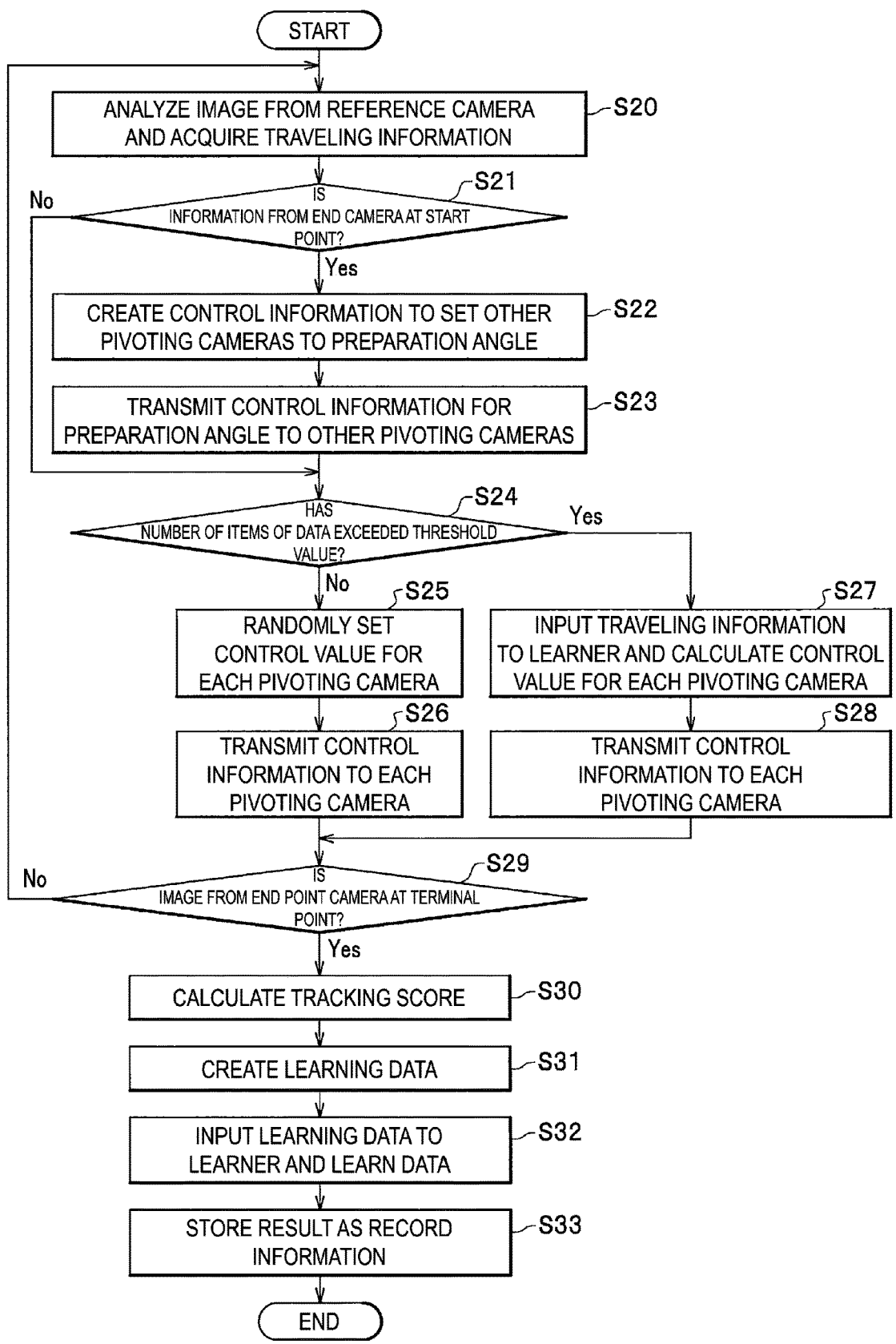
FIG. 11 is a flowchart illustrating a flow of processing in a learning phase executed by the moving target tracking device according to the present embodiment.

FIG. 11 is a flowchart illustrating a flow of processing in the learning phase executed by the moving target tracking device 1 according to the present embodiment.

First, the image recognition unit 130 (tracking target analysis unit 131) of the moving target tracking device 1 acquires and analyzes an image from the reference camera 51 and acquires traveling information (the speed and the traveling direction) (Step S20). Then, the tracking target analysis unit 131 outputs the acquired traveling information (the speed and the traveling direction) to the device coordination unit 110.

Next, the learning data collection unit 113 of the device coordination unit 110 that has acquired the traveling information determines whether or not the acquired traveling information (the speed and the traveling direction) is information from the reference camera 51 at the end point that is a start point of the tracking section (the end point camera at the start point) (Step S21).

In a case in which the information is not from the end point camera at the start point (Step S21→No), then the learning data collection unit 113 moves on to Step S24. On the other hand, in a case in which the information is from the end point camera at the start point (Step S21→Yes), the processing proceeds to the next Step S22.

In Step S22, the learning data collection unit 113 creates control information for setting the pivoting cameras 52 other than the pivoting cameras within one hop from the end point camera at the start point to the preparation angle (45 degrees).

Then, the learning data collection unit 113 transmits the created control information regarding the preparation angle to the pivoting cameras 52 other than the pivoting cameras 52 within one hop from the end point camera at the start point via the device control unit 120 (Step S23). In this manner, the camera directions of the other pivoting cameras 52 are set to the preparation angle.

Next, the learning data collection unit 113 determines whether or not the number of items of data of the record information 410 stored in the record information DB 400 has exceeded a predetermined threshold value (Step S24). In a case in which the number of items of data has not exceeded the predetermined threshold value (Step S24→No), the processing proceeds to Step S25.

In Step S25, the learning data collection unit 113 sets, as random values, information regarding the control values (the rotation direction, the designated angle, and the rotation start time) of each pivoting camera 52 corresponding to the traveling information (the speed and the traveling direction) acquired in Step S20 and creates control information for each pivoting camera 52. Then, the learning data collection unit 113 stores the information regarding the control values for each pivoting camera 52 corresponding to the traveling information (the speed and the traveling direction) in the learning data 300.

Next, the learning data collection unit 113 transmits the created control information for each pivoting camera 52 to each pivoting camera 52 via the device control unit 120 (Step S26). In this manner, each pivoting camera 52 executes control based on the randomly set control values. Then, the processing proceeds to next Step S29.

On the other hand, in a case in which the number of items of data of the record information 410 has exceeded the predetermined threshold value in Step S24 (Step S24→Yes), the processing proceeds to Step S27.

In Step S27, the learning data collection unit 113 outputs the traveling information (the speed and the traveling direction) acquired in Step S20 to the machine learning unit 114. Then, the machine learning unit 114 calculates information regarding the control values (the rotation direction, the designated angle, and the rotation start time) of each pivoting camera 52 as output data by inputting the traveling information (the speed and the traveling direction) to the learner 100.

Next, in Step S28, the learning data collection unit 113 acquires the information regarding the control values obtained through the machine learning from the machine learning unit 114 and creates the control information for each pivoting camera 52. Then, the learning data collection unit 113 stores information regarding the control values for each pivoting camera 52 corresponding to the traveling information (the speed and the traveling direction) in the learning data 300. Then, the learning data collection unit 113 transmits the created control information for each pivoting camera 52 to each pivoting camera 52 via the device control unit 120. In this manner, control based on the control values calculated by the learner 100 is executed for each pivoting camera 52. Then, the processing proceeds to next Step S29.

In Step S29, the tracking target analysis unit 131 of the image recognition unit 130 acquires the image of the target vehicle and then determines whether or not the image is an image from the reference camera 51 at the end point that is the terminal point of the tracking section (the end point camera at the terminal point).

If the image is not from the end point camera at the terminal point (Step S29→No), then the processing returns to Step S20, and the processing is continued. On the other hand, if the image is from the end point camera at the terminal point (Step S29→Yes), then the processing proceeds to next Step S30.

In Step S30, the tracking score calculation unit 132 of the image recognition unit 130 calculates the tracking score using the aforementioned equation (1). Then, the tracking score calculation unit 132 outputs the calculated tracking score to the device coordination unit 110.

The learning data collection unit 113 of the device coordination unit 110 generates the learning data 300 by storing the acquired tracking score in association with the traveling information and the control values stored in advance (Step S31).

Next, the machine learning unit 114 inputs the traveling information, the control values, and the tracking score indicated by the learning data 300 generated in Step S31 to the learner 100 and causes the learner 100 to learn the learning data 300 (Step S32). Then, the machine learning unit 114 updates the record information 410 by storing the traveling information, information of the control values, and the tracking score that the learner 100 has been caused to learn in the record information 410 (FIG. 6) in which data is summarized for each predetermined range of speed (Step S33) and then ends the processing.

In this manner, the moving target tracking device 1 sets random values as the control values (the rotation direction, the designated angle, and the rotation start time) in a case in which the number of items of data regarding the target vehicle is equal to or less than the predetermined threshold value, and calculates the tracking score from a result of performing control using the control values obtained by the learner 100 in a case in which the number of items of data has exceeded the predetermined threshold value. Then, the moving target tracking device 1 can create the record information 410 in which the tracking scores corresponding to the control values are summarized for each predetermined range of speed, as a result of the learning phase.

Note that in the method based on the machine learning using the learner 100 (learning device), for example, multilayer perceptron (neural network) in the machine learning unit 114 according to the present embodiment, a target score is defined when the control values are generated. The machine learning unit 114 designates 100 points out of 100 points, for example, as the target score and causes the learner 100 to calculate the control values for each pivoting camera 52. Then, the image recognition unit 130 (tracking score calculation unit 132) calculates the tracking score that is a result of controlling each pivoting camera 52 using the calculated control values (40 points, for example), and the learner 100 is caused to perform learning using as well as the traveling information, the control values, and the tracking score (40 points) at that time as learning data to update the learner 100.

In other words, the device coordination unit 110 (machine learning unit 114) calculates the control values in accordance with a current situation based on the traveling information obtained by the image recognition unit 130 analyzing the current situation of the target vehicle (Plan). Then, the device control unit 120 controls each pivoting camera 52 by using the control values as in Plan (Do). The image recognition unit 130 (tracking score calculation unit 132) calculates the result of the control as a tracking score (Check) and causes the learner 100 to learn the tracking score as new learning data (Action). In the learning phase, the learner 100 can generate optimal control values through repetition of such a PDCA cycle.

Operation Phase

Next, the operation phase is described.

Figure 12:
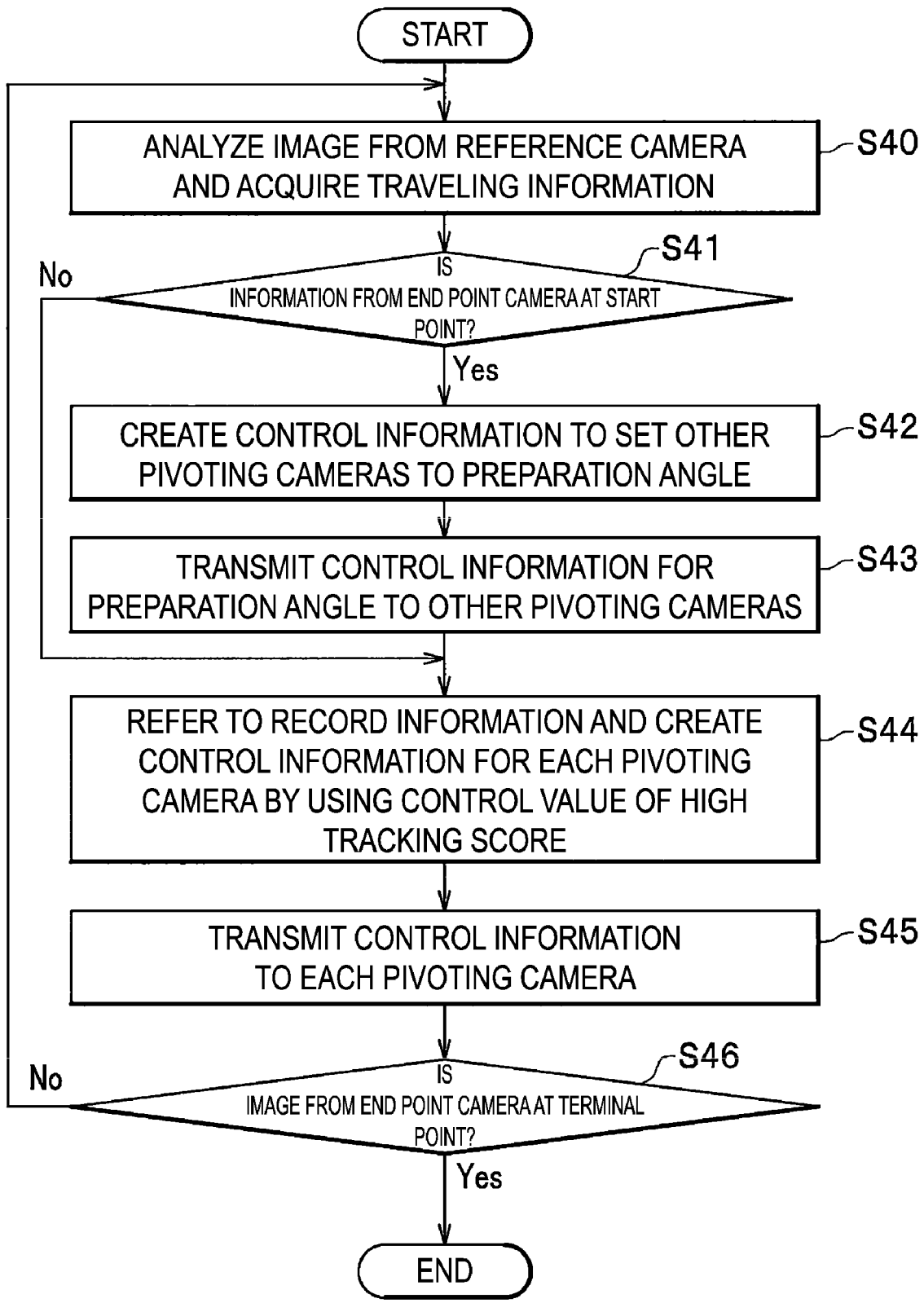
FIG. 12 is a flowchart illustrating a flow of processing in an operation phase executed by the moving target tracking device according to the present embodiment.

FIG. 12 is a flowchart illustrating a flow of processing in the operation phase executed by the moving target tracking device 1 according to the present embodiment.

First, the image recognition unit 130 (tracking target analysis unit 131) of the moving target tracking device 1 acquires and analyzes an image from the reference camera 51 and acquires the traveling information (the speed and the traveling direction) (Step S40). Then, the tracking target analysis unit 131 outputs the acquired traveling information (the speed and the traveling direction) to the device coordination unit 110.

Next, the control information creation unit 115 of the device coordination unit 110 that has acquired the traveling information determines whether or not the acquired traveling information (the speed and the traveling direction) is information from the reference camera 51 at the end point that is the start point of the tracking section (the end point camera at the start point) (Step S41).

In a case in which the information is not from the end point camera at the start point (Step S41→No), then the control information creation unit 115 moves on to Step S44. On the other hand, in a case in which the information is from the end point camera at the start point (Step S41→Yes), the processing proceeds to next Step S42.

In Step S42, the control information creation unit 115 creates control information for setting the pivoting cameras 52 other than the pivoting cameras 52 within one hop from the end point camera at the start point to the preparation angle (45 degrees).

Then, the control information creation unit 115 transmits the created control information for the preparation angle to the pivoting cameras 52 other than the pivoting cameras 52 within one hop from the end point camera at the start point via the device control unit 120 (Step S43). In this manner, the camera direction of the other pivoting cameras 52 are set to the preparation angle.

Next, in Step S44, the control information creation unit 115 uses the traveling information (the speed and the traveling direction) acquired in Step S40, refers to the record information 410 (FIG. 6) of the corresponding speed and direction, and acquires information regarding the control values for each pivoting camera 52 with the highest tracking score among tracking scores indicated by the record information 410. Then, the control information creation unit 115 creates control information for each pivoting camera 52 using the acquired control values (the rotation direction, the designated angle, and the rotation start time) of each pivoting camera 52.

Then, the control information creation unit 115 transmits the created control information to each pivoting camera 52 via the device control unit 120 (Step S45). In this manner, the angle of each pivoting camera 52 is set to the designated angle, and control based on the control values with the highest tracking score in the entire tracking section as a past record is executed.

Next, the tracking target analysis unit 131 of the image recognition unit 130 acquires an image of the target vehicle and then determines whether or not the image is an image from the reference camera 51 at the end point that is a terminal point of the tracking section (the end point camera at the terminal point) (Step S46).

If the image is not from the end point camera at the terminal point (Step S46→No), then the processing returns to Step S40, and the processing is continued. On the other hand, if the image is from the end point camera at the terminal point (Step S46→Yes), the processing is ended.

In this manner, the moving target tracking device 1 refers to the record information 410 based on the traveling information (the speed and the traveling direction) obtained from the image acquired from the reference camera 51 and creates the control information for each pivoting camera 52 using the control values with the highest tracking score. It is thus possible to control each pivoting camera 52 with the optimal control values in the entire tracking section. Also, because the control information is created based on the speed obtained for each reference camera 51, it is possible to perform control such that the pivoting cameras 52 follow the target vehicle even in a case in which the speed of the target vehicle is changed due to acceleration, deceleration, or the like.

Evaluation Data

Evaluation of the control values obtained by the learner 100 (learning device) of the moving target tracking device 1 according to the present embodiment was carried out by the following approaches.

Figure 13:
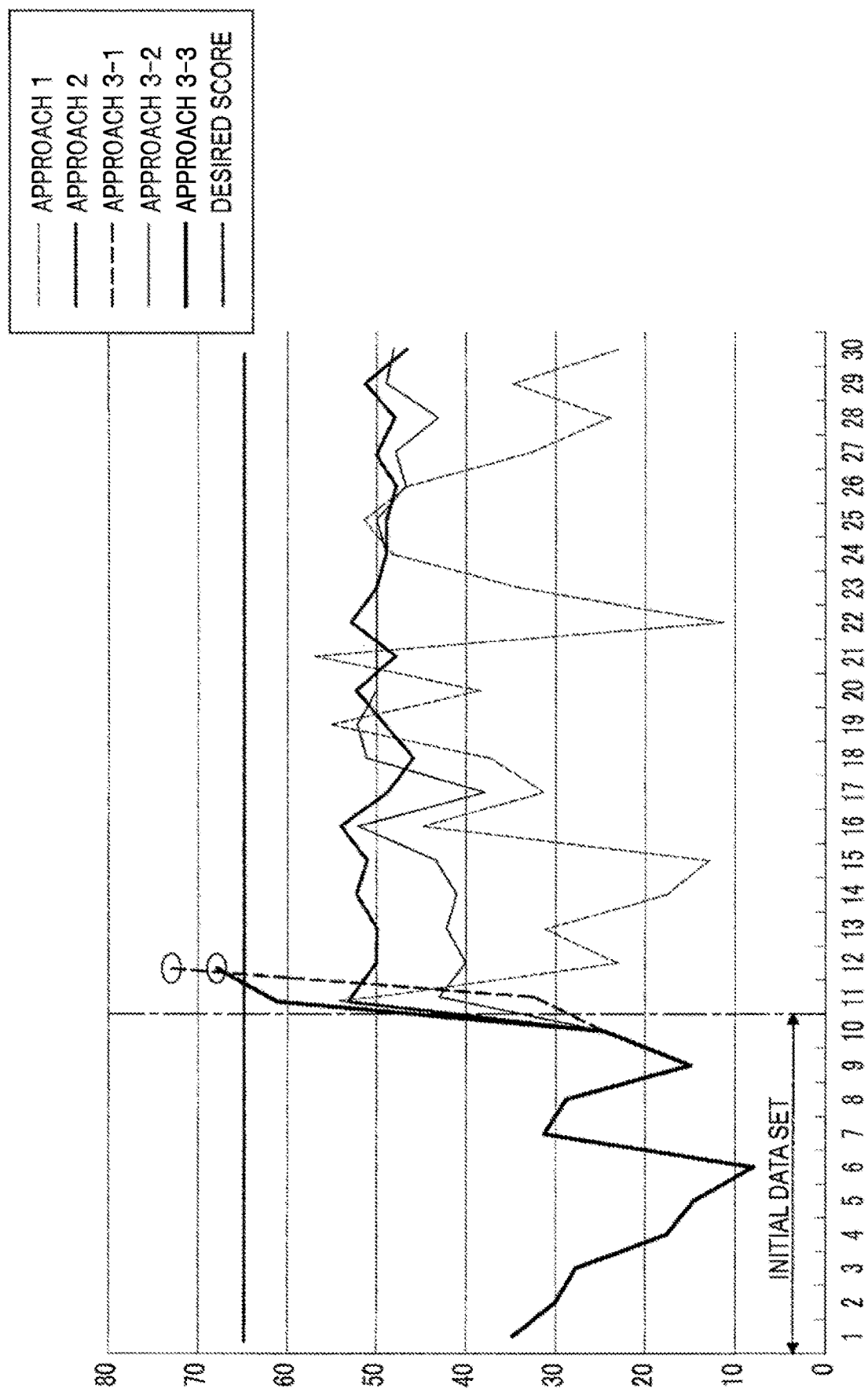
FIG. 13 is a diagram illustrating a result of evaluating a control value calculated by a learner.

FIG. 13 is a diagram illustrating a result of evaluating the control values calculated by the learner 100.

Here, Approach 1 is a "random" approach. Approach 2 is a "random forest" approach. Approach 3 is a "multilayer perceptron (neural network)" approach employed in the present embodiment. The horizontal axis is the number of trials, and the vertical axis is a score in FIG. 13. Here, the number of trials (the number of times the vehicle travels) required until control values with a target score "65" or higher was discovered was evaluated.

"Multilayer perceptron" in Approach 3 was implemented by python scikit-learn (python is a trade name), and parameters were changed.

In Approach 3-1 (initial parameter setting), hidden layers were set to "three layers (100, 100, 100)", a learning repetition number max tier was set to "200", and alpha (penalty of L2 normalization) was set to "0.0001".

In Approach 3-2, Approach 3-1 (initial parameter setting) was changed to the learning repetition number max tier "5000".

In Approach 3-3, the hidden layers in Approach 3-1 (initial parameter setting) were changed to "six layers (100, 100, 100, 100, 100, 100)".

The result of the evaluation shows that Approach 3, which is the "multilayer perceptron" approach is an effective approach to quickly search for the control values with a high score as compared with Approach 1, which is the "random" approach, and Approach 2, which is the "random forest" approach. In Approach 3-1 and Approach 3-3, the control values with the target score or more were successfully discovered in the second trial after the learning of the initial data set had been ended and the estimation was started. Note that it was assumed that excessive learning occurred in Approach 3-2 because a large number of times the learning was repeated were set. This shows that Approach 3, which is the "multilayer perceptron" approach, was effectively used by setting hyper parameters for preventing excessive learning, increasing the hidden layers, and the like.

Hardware Configuration

Figure 14:
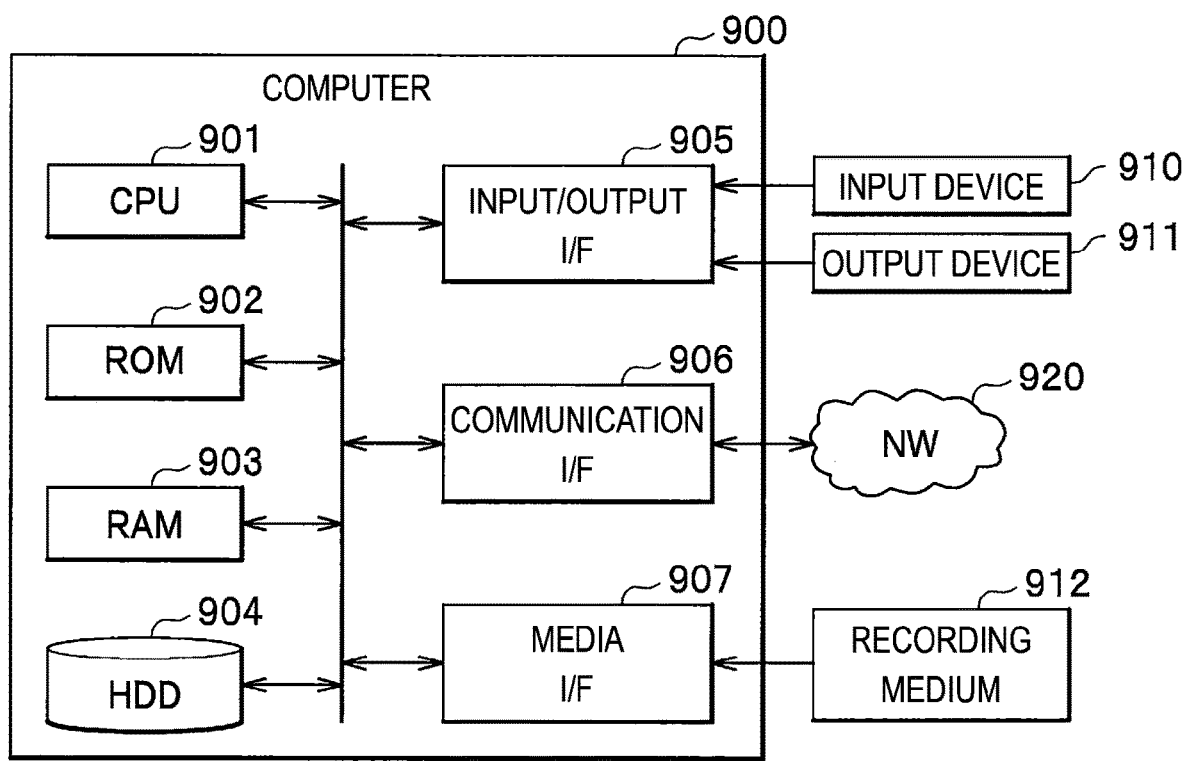
FIG. 14 is a hardware configuration diagram illustrating an example of a computer that achieves functions of the moving target tracking device according to the present embodiment.

The moving target tracking device 1 according to the present embodiment is achieved by a computer 900 with the configuration as illustrated in FIG. 14, for example.

FIG. 14 is a hardware configuration diagram illustrating an example of the computer 900 that achieves the functions of the moving target tracking device 1 according to the present embodiment. The computer 900 includes a CPU 901, a read only memory (ROM) 902, a RAM 903, a hard disk drive (HDD) 904, an input-output interface (I/F) 905, a communication I/F 906, and a media I/F 907.

The CPU 901 operates based on programs stored in the ROM 902 or the HDD 904 and performs control using the control unit 10 of the moving target tracking device 1 illustrated in FIG. 3. The ROM 902 stores a boot program that is executed by the CPU 901 when the computer 900 is activated, a program for the hardware of the computer 900 and the like.

The CPU 901 controls an input device 910 such as a mouse and a keyboard, and an output device 911 such as a display and a printer through the input-output I/F 905. Through the input-output I/F 905, the CPU 901 acquires data from the input device 910, and outputs the generated data to the output device 911. A graphics processing unit (GPU) or the like may be used together with the CPU 901 as a processor.

The HDD 904 stores a program executed by the CPU 901, data used by the program, and the like. The communication I/F 906 receives data from another device through a communication network (for example, a network (NW) 920), outputs the received data to the CPU 901, and transmits the data generated by the CPU 901 to another device through the communication network.

The media I/F 907 reads a program or data stored in a recording medium 912 and outputs the program or the data that has been read to the CPU 901 through the RAM 903. The CPU 901 loads, in the RAM 903, a program for an intended process from the recording medium 912 through the media I/F 907 and executes the loaded program. The recording medium 912 is an optical recording medium such as a digital versatile disc (DVD) and a phase change rewritable disk (PD), a magneto-optical recording medium such as a magneto optical disk (MO), a magnetic recording medium, a conductor memory tape medium, a semiconductor memory or the like.

For example, in a case in which the computer 900 functions as the moving target tracking device 1 according to the present embodiment, the CPU 901 of the computer 900 achieves the functions of the moving target tracking device 1 by executing a program loaded on the RAM 903. In addition, the HDD 904 stores data in the RAM 903. The CPU 901 reads a program for an intended process from the recording medium 912 and executes it. In addition, the CPU 901 may read a program related to a target processing from another device via the communication network (NW 920).

Effects

Hereinafter, effects of the moving target tracking device and the like according to the present embodiment is described.

The moving target tracking device according to the embodiment is the moving target tracking device 1 that tracks a moving target through control of the camera device group 50, in which the camera device group 50 includes reference cameras 51 that are fixed to image the moving target and the pivoting cameras 52 that image the moving target by following movement of the moving target, the moving target tracking device 1 including the position information creation unit 112 that creates camera position information indicating adjacency relationships of the plurality of reference cameras 51 and the plurality of pivoting cameras 52 by using a capturing order and a traveling direction of the moving target that has passed through a tracking section for tracking the moving target, the tracking target analysis unit 131 that acquires the images from the reference cameras 51 and detects traveling information indicating a speed and the traveling direction of the moving target, the tracking score calculation unit 132 that calculates a tracking score that is an evaluation value indicated by a proportion at which any of the plurality of pivoting cameras 52 can capture the moving target in the entire tracking section if the moving target passes through the tracking section; the machine learning unit 114 including the learning device (learner 100) configured to output control values including rotation directions of the pivoting cameras 52, designated angles when tracking is started, and rotation start times until rotation starts after the designated angles are set, of each of the pivoting cameras 52 if the traveling information is input, the machine learning unit 114 configured to acquire the tracking score as a result of controlling each of the pivoting cameras 52 using the control values obtained from the learning device and store, in the storage 12, the control values of each of the pivoting cameras 52 and the tracking score as the record information 410 in association with the traveling information; and the control information creation unit 115 configured to refer to the record information 410 if traveling information is acquired from the reference cameras 51, acquire the control values for each of the pivoting cameras 52 corresponding to a tracking score that is equal to or greater than a predetermined value, create control information, and cause the control information to be transmitted to each of the pivoting cameras 52.

In this manner, the moving target tracking device 1 can create the camera position information indicating the adjacency relationships of the reference cameras 51 and the pivoting cameras 52, then refers to the record information 410 and acquire the information regarding the control values (the rotation direction, the designated angle, and the rotation start time) of each pivoting camera 52 using the traveling information (the speed and the traveling direction) obtained from the reference cameras 51, thereby creating the control information. The moving target tracking device 1 can follow the moving target with each pivoting camera 52 in a case in which the speed of the moving target changes because the control information is created in accordance with the information from each reference camera 51.

Also, the moving target tracking device 1 acquires the control values corresponding to the tracking score that is equal to or greater than the predetermined value (more preferably, the highest tracking score) with reference to the record information 410 and can thus control each pivoting camera 52 in an optimal manner over the entire tracking section.

In the moving target tracking device 1, if the tracking target analysis unit 131 analyzes the images from the reference cameras 51 and detects the traveling information, then the control information creation unit 115 identifies a reference camera positioned next in the traveling direction of the moving target in the tracking section using the camera position information 200, creates control information to set a preparation angle that is an angle at which the cameras are oriented on an entry direction side of the moving target, and transmits the control information to pivoting cameras 52 succeeding the identified reference camera 51 in the traveling direction.

In this manner, the moving target tracking device 1 can reliably follow the moving target because the pivoting cameras 52 are directed to the side of the entry direction of the moving target in advance as preparation even in a case in which the distance between the reference camera 51 and the reference camera 51 located next in the traveling direction is short.

The learning device (learner 100) according to the embodiment is a learning device that calculates control values of a camera device group for tracking a moving target, in which the camera device group 50 is configured with the reference cameras 51 that are fixed to image the moving target and pivoting cameras 52 that image the moving target by following movement of the moving target, the learning device inputs, as learning data, traveling information indicating a speed and a traveling direction of the moving target obtained by analyzing images acquired from the reference cameras 51, control values including rotation directions of the pivoting cameras, designated angles when tracking is started, and rotation start times until rotation starts after the designated angle is set, of each of the pivoting cameras 52, and a tracking score calculated as an evaluation value indicated as a proportion at which any of the plurality of pivoting cameras 52 have been able to capture the moving target in the entire tracking section when the moving target passes through the tracking section for tracking the moving target; and outputs the control values for each of the plurality of pivoting cameras 52 that has the high tracking score if the traveling information is input.

In this manner, the learning device (learner 100) can generate a learning model for outputting the information regarding the control values (the rotation direction, the designated angle, and the rotation start time) of each pivoting camera 52 with a higher tracking score if the traveling information (the speed and the traveling direction) from the reference camera 51 is input.

The present invention is not limited to the embodiment described above, and various modifications can be made by those skilled in the art within the technical idea of the present invention.

For example, the rotation directions, the designated angles, and the rotation start times are described as examples of the control values for the pivoting cameras 52 in the present embodiment. However, the present invention is not limited to this example, and information regarding the rotation speeds of the pivoting cameras 52, for example, may be included. In a case in which a function capable of adjusting the rotation speed of the pivoting camera 52 is included, it is possible to improve accuracy of tracking by adding the information of the rotation speed to control the pivoting cameras 52.

Although the learning is performed using random values in the initial stage of the learning phase in the present embodiment, transfer learning of learning data used in another tracking section may be performed, for example. In this manner, it is possible to cause the learner 100 (learning device) to perform learning such that control values with which the target evaluation value (tracking score) is achieved can be discovered earlier.

Moreover, the tracking score may be calculated in the operation phase as well to generate learning data. It is possible to acquire the record information 410 with a higher tracking score and to improve accuracy in tracking of the target vehicle by causing the learner 100 (learning device) to learn the generated learning data.

REFERENCE SIGNS LIST

1: Moving target tracking device
10: Control unit
11: Input/output unit
12: Storage
50: Camera device group
51: Reference camera
52: Pivoting camera
100: Learner (learning device)
110: Device coordination unit
111: Initial setting unit
112: Position information creation unit
113: Learning data collection unit
114: Machine learning unit
115: Control information creation unit
120: Device control unit
130: Image recognition unit
131: Tracking target analysis unit
132: Tracking score calculation unit
200: Camera position information
300: Learning data
400: Record information DB
410: Record information
1000: Moving target tracking system

The invention claimed is:

1. A moving target tracking device that tracks a moving target through control of a camera device group, wherein
the camera device group includes a reference camera that is fixed to image the moving target and
a pivoting camera that images the moving target by following movement of the moving target, and
the moving target tracking device comprises:
a position information creation unit, including one or more processors, configured to create camera position information indicating adjacency relationships of a plurality of the reference cameras and a plurality of the pivoting cameras by using a capturing order and a traveling direction of the moving target that has passed through a tracking section for tracking the moving target;
a tracking target analysis unit, including one or more processors, configured to acquire an image from the reference camera and detect traveling information indicating a speed and the traveling direction of the moving target;
a tracking score calculation unit, including one or more processors, configured to calculate a tracking score when the moving target passes through the tracking section, the tracking score being an evaluation value indicated by a proportion of the pivoting cameras that have been able to capture the moving target to all of the pivoting cameras in the tracking section;
a machine learning unit, including one or more processors, including a learning device configured to output a control value including a rotation direction of each of the pivoting cameras, a designated angle when tracking is started, and a rotation start time until rotation starts after the designated angle is set, of each of the pivoting cameras when the traveling information is input,
the machine learning unit, including one or more processors, configured to acquire the tracking score as a result of controlling each of the pivoting cameras using the control value obtained from the learning device and store, in a storage, the control value for each of the pivoting cameras and the tracking score as record information in association with the traveling information; and
a control information creation unit, including one or more processors, configured to refer to the record information when traveling information is acquired from the reference camera, acquire the control value for each of the pivoting cameras corresponding to a tracking score that is equal to or greater than a predetermined value to create control information, and transmit the control information to each of the pivoting cameras.

2. The moving target tracking device according to claim 1, wherein when the tracking target analysis unit analyzes the image from the reference camera and detects the traveling information,
the control information creation unit identifies a reference camera positioned next in the traveling direction of the moving target in the tracking section by using the camera position information,
creates control information to set a preparation angle that is an angle at which the pivoting camera is oriented to an entry direction of the moving target, and transmits the control information to a pivoting camera following in the traveling direction the reference camera identified.

3. A moving target tracking method performed by a moving target tracking device that tracks a moving target through control of a camera device group, wherein
the camera device group includes a reference camera that is fixed to image the moving target and
a pivoting camera that images the moving target by following movement of the moving target, and
the moving target tracking method comprises:
creating camera position information indicating adjacency relationships of a plurality of the reference cameras and a plurality of the pivoting cameras by using a capturing order and a traveling direction of the moving target that has passed through a tracking section for tracking the moving target;

acquiring an image from the reference camera and detecting traveling information indicating a speed and the traveling direction of the moving target;

calculating a tracking score when the moving target passes through the tracking section, the tracking score being an evaluation value indicated by a proportion of any of the pivoting cameras that have been able to capture the moving target to all of the pivoting cameras in the tracking section;

acquiring the tracking score as a result of controlling each of the pivoting cameras by using a control value obtained from a learning device, the learning device configured to output the control value including a rotation direction of the pivoting camera, a designated angle when tracking is started, and a rotation start time until rotation starts after the designated angle is set, of each of the pivoting cameras when the traveling information is input, and storing, in a storage, the control value for each of the pivoting cameras and the tracking score as record information in association with the traveling information; and referring to the record information when traveling information is acquired from the reference camera, acquiring the control value for each of the pivoting cameras corresponding to a tracking score that is equal to or greater than a predetermined value to create control information, and transmitting the control information to each of the pivoting cameras.

4. A moving target tracking system comprising:

a camera device group; and a moving target tracking device configured to track a moving target through control of the camera device group, wherein the camera device group includes a reference camera that is fixed to image the moving target and a pivoting camera that images the moving target by following movement of the moving target, and the moving target tracking device comprises:

a position information creation unit, including one or more processors, configured to create camera position information indicating adjacency relationships of a plurality of the reference cameras and a plurality of the pivoting cameras by using a capturing order and a traveling direction of the moving target that has passed through a tracking section for tracking the moving target;

a tracking target analysis unit, including one or more processors, configured to acquire an image from the reference camera and detect traveling information indicating a speed and the traveling direction of the moving target;

a tracking score calculation unit, including one or more processors, configured to calculate a tracking score when the moving target passes through the tracking section, the tracking score being an evaluation value indicated by a proportion of the pivoting cameras that have been able to capture the moving target to all of the pivoting cameras in the tracking section;

a machine learning unit, including one or more processors, including a learning device configured to output a control value including a rotation direction of the pivoting camera, a designated angle when tracking is started, and a rotation start time until rotation starts after the designated angle is set, of each of the pivoting cameras if the traveling information is input, the machine learning unit configured to acquire the tracking score as a result of controlling each of the pivoting cameras by using the control value obtained from the learning device and store, in a storage, the control value for each of the pivoting cameras and the tracking score as record information in association with the traveling information; and a control information creation unit, including one or more processors, configured to refer to the record information when traveling information is acquired from the reference camera, acquire the control value for each of the pivoting cameras corresponding to a tracking score that is equal to or greater than a predetermined value to create control information, and transmit the control information to each of the pivoting cameras.

5. A learning device that calculates control values of a camera device group for tracking a moving target, wherein the camera device group includes a reference camera that is fixed to image the moving target and a pivoting camera that images the moving target by following movement of the moving target, and the learning device inputs, as learning data, traveling information indicating a speed and a traveling direction of the moving target obtained by analyzing images acquired from the reference camera, a control value of each of the pivoting cameras, the control value including a rotation direction of the pivoting camera, a designated angle when tracking is started, and a rotation start time until rotation starts after the designated angle is set, and a tracking score calculated as an evaluation value indicated by a proportion at which any of a plurality of the pivoting cameras have been able to capture the moving target in an entirety of a tracking section when the moving target passes through the tracking section for tracking the moving target, and when the traveling information is input, outputs the control value for each of the plurality of pivoting cameras so that the tracking score becomes higher.

6. A non-transitory computer-readable storage medium storing a program for causing a computer to operate as the moving target tracking device according to claim 1.

7. A non-transitory computer-readable storage medium storing a program for causing a computer to operate as the moving target tracking device according to claim 2.

* * * * *